US012519622B2

(12) United States Patent
Rindal

(10) Patent No.: US 12,519,622 B2
(45) Date of Patent: Jan. 6, 2026

(54) REPLICATED SECRET SHARE GENERATION FOR DISTRIBUTED SYMMETRIC CRYPTOGRAPHY

(71) Applicant: VISA INTERNATIONAL SERVICE ASSOCIATION, San Francisco, CA (US)

(72) Inventor: Peter Rindal, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 48 days.

(21) Appl. No.: 18/696,959

(22) PCT Filed: Sep. 30, 2021

(86) PCT No.: PCT/US2021/052821
§ 371 (c)(1),
(2) Date: Mar. 28, 2024

(87) PCT Pub. No.: WO2023/055371
PCT Pub. Date: Apr. 6, 2023

(65) Prior Publication Data
US 2024/0413984 A1    Dec. 12, 2024

(51) Int. Cl.
*H04L 9/08*    (2006.01)
*H04L 9/32*    (2006.01)
(52) U.S. Cl.
CPC ............ *H04L 9/085* (2013.01); *H04L 9/0869* (2013.01); *H04L 9/3247* (2013.01)
(58) Field of Classification Search
None
See application file for complete search history.

(56) References Cited

U.S. PATENT DOCUMENTS

2018/0278594 A1* 9/2018 Schiffman ............. H04L 9/0861
2019/0356475 A1* 11/2019 Resch .................... H04L 9/085
(Continued)

FOREIGN PATENT DOCUMENTS

| CN | 108768666 A | 11/2018 |
| EP | 3439234 A1 | 2/2019 |
| KR | 20200059234 A | 5/2020 |

OTHER PUBLICATIONS

Application No. PCT/US2021/052821, International Search Report and Written Opinion, Mailed On Jun. 13, 2022, 11 pages.
(Continued)

*Primary Examiner* — William J. Goodchild
(74) *Attorney, Agent, or Firm* — Kilpatrick Townsend & Stockton LLP

(57) ABSTRACT

Methods and systems for securely generating secret shares in a distributed manner and distributing those secret shares to cryptographic devices are disclosed. The cryptographic devices can use these secret shares to perform threshold distributed cryptographic operations (e.g., encryption and decryption). The cryptographic devices can be partitioned into groups based on the total number of devices and a threshold number. One generating device from each group can generate a secret share corresponding to that group, then transmit the secret share to members of the group. The generating devices can also generate commitments and transmit those commitments to other cryptographic devices. A group of confirming devices can use the commitments to generate confirmation values that can be used to confirm that the secret share were generated and distributed correctly. Later, a threshold number of cryptographic devices, collectively possessing all the secret shares can perform cryptographic operations using those secret shares.

20 Claims, 8 Drawing Sheets

(56) References Cited

U.S. PATENT DOCUMENTS

| | | |
|---|---|---|
| 2019/0372768 A1 | 12/2019 | Veeningen |
| 2020/0259651 A1 | 8/2020 | Mohassel et al. |
| 2021/0243020 A1 | 8/2021 | Mukherjee et al. |

OTHER PUBLICATIONS

Agrawal, et al., "DiSE: Distributed Symmetric-Key Encryption", *Work done as an intern at Visa Research, 56 pages.

* cited by examiner

REPLICATED SECRET SHARE GENERATION FOR DISTRIBUTED SYMMETRIC CRYPTOGRAPHY

CROSS-REFERENCES TO RELATED APPLICATIONS

This application is a 371 application of International Application No. PCT/US2021/052821, filed Sep. 30, 2021, which is herein incorporated by reference in its entirety for all purposes.

BACKGROUND

Distributed cryptography can include methods whereby multiple devices, computers, or parties collectively perform cryptographic operations, such as encryption or decryption. This is in contrast to standard cryptography, where a single device can use a cryptographic key or keys to encrypt plaintext, decrypt ciphertext, form a digital signature, etc. In distributed cryptography, each participating cryptographic device can possess one or more secret shares (also known as key shares). Some number of participating cryptographic devices can use their secret shares to perform encryption or decryption operations. As an example, the participating cryptographic devices can use their secret shares to generate a session key and the session key can be used to encrypt a message or decrypt a ciphertext.

Distributed cryptography can be used to implement "cryptography as a service," which may refer to processes where entities (such as cryptographic devices) perform cryptographic operations on behalf of other entities (e.g., client computers). For example, cryptographic devices can encrypt data such as sensitive medical records on behalf of a client computer associated with a hospital. At a later time when the client computer wants to retrieve the encrypted data, the client computer may communicate with the cryptographic devices in order to decrypt the encrypted data. Cryptography as a service may be desirable because cryptographic devices may be better suited than client computers to store sensitive cryptographic information such as secret shares.

One advantage of distributed cryptography is that it is more secure against attacks by cybercriminals. In a standard cryptographic system, a cybercriminal only needs to steal one cryptographic key in order to perform encryption or decryption at will. By contrast, in a distributed cryptographic system, a cybercriminal needs to steal multiple secret shares from multiple cryptographic devices. As a result, it requires more effort on the part of the cybercriminal, and thus the system is more secure.

However, in many distributed cryptographic schemes, all of the secret shares are generated by a single computer system, often referred to as a "trusted external computer." Often, a trusted external computer will generate a secret value (sometimes referred to as a "shared secret" or a "master key") and use the secret value to derive the secret shares before distributing the secret shares to the cryptographic devices. This presents a security vulnerability, as a cybercriminal could simply steal the secret value or the secret shares from the trusted external computer. Using the secret shares or secret value, the cybercriminal can perform encryption or decryption at will. Alternatively, if the trusted external computer is operated by a corrupt or untrustworthy organization, the trusted external computer could use the secret value or secret shares in order to decrypt messages encrypted by the cryptographic devices.

Thus, there is a need for improvements to replicated key distributed symmetric cryptography to address the security vulnerability associated with relying on an external computer for secret share generation.

SUMMARY

Embodiments of the present disclosure are directed to methods and systems for generating and distributing secret shares to cryptographic devices. The cryptographic devices can later use these secret shares to perform cryptographic operations such as encryption or decryption using threshold distributed symmetric cryptography.

In some methods according to embodiments, the cryptographic devices are initially partitioned into d groups, where d is a function of the total number of cryptographic devices n and the desired threshold t. In each group, one device is selected as the "generating device." Each group's generating device generates and distributes a secret share $sk_i$ to all devices in the group. Each group's generating device can also generate a commitment and a signature and transmit them to other cryptographic devices. The other cryptographic devices can use the commitment and signature to verify that each generating device correctly generated and distributed its respective secret share.

If this process is performed successfully, each cryptographic device can possess some number of secret shares, and any threshold number t of cryptographic devices can collectively possess all d secret shares. Later, any t cryptographic devices can use their secret shares to perform distributed symmetric encryption or decryption.

One embodiment is directed to a method performed by a first generating device of a plurality of cryptographic devices. The first generating device can generate a first secret share corresponding to a first device group, the first device group comprising the first generating device and one or more other cryptographic devices of the plurality of cryptographic devices. The first generating device can also generate a first commitment by hashing the first secret share using a first hash function. The first generating device can additionally generate a first signature by digitally signing the first commitment using a first private key. The first generating device can transmit the first secret share to the one or more cryptographic devices in the first device group. The first generating device can transmit the first commitment and the first signature to a plurality of other cryptographic devices. The plurality of other cryptographic devices can verify that the first signature is valid. The first generating device can receive one or more confirmation values from a confirming device group, the confirming device group comprising a threshold number of cryptographic devices of the plurality of cryptographic devices. The confirming device group can generate the one or more confirmation values using a second hash function, the first commitment, and one or more other commitments generated by one or more other generating devices. After receiving the plurality of confirmation values, the first generating device can verify that the one or more confirmation values are equivalent to each other.

Another embodiment is directed to a method performed by a confirming device of a plurality of cryptographic devices. The confirming device can receive, from a generating device, a secret share, a commitment, and a digital signature. The generating device can generate the commitment using the secret share and a hash function. The generating device can generate the digital signature by digitally signing the commitment using a private key corresponding to the generating device. The confirming device can receive, from one or more other generating devices, one or more other commitments and one or more other digital signatures. The one or more other generating devices can generate the one or more other commitments using one or more other secret shares and the hash function. The one or more other generating devices can generate the one or more digital signatures by digitally signing the one or more other commitments using one or more other private keys. The confirming device can generate a confirmation value using a second hash function, the commitment, and the one or more other commitments. The confirming device can then transmit the confirmation value to a plurality of other cryptographic devices. Additionally, the confirming device can receive one or more other confirmation values from one or more other confirming devices and verify that the one or more other confirmation values and the confirmation value are equivalent.

These and other embodiments of the disclosure are described in detail below. For example, other embodiments are directed to systems, devices, and computer readable media associated with methods described herein.

Prior to discussing specific embodiments of the disclosure, some terms may be described in detail.

Terms

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The term "cryptographic key" may refer to data used to perform encryption or decryption. For example, a cryptographic key may refer to a product of two large prime numbers. A cryptographic key may be used in a cryptosystem such as RSA (Rivest, Shamir, Adleman) or AES (Advanced Encryption Standard), and may be used to encrypt plaintext and produce a ciphertext output, or decrypt ciphertext and produce a plaintext output. Cryptographic keys may be symmetrical, in which case the same key is used for encryption and decryption, or asymmetrical, in which case different keys are used for encryption and decryption.

The term "session key" may refer to a cryptographic key used to perform encryption or decryption during a particular "session." A session may include a limited and/or defined period of time or use. For example, a session may comprise a 15 minute period, 10 encryption operations, a single decryption operation, etc.

The term "bulk key" may refer to data used in encryption or decryption. A bulk key may be used to generate one or more "message keys," which can be used to encrypt or decrypt messages corresponding to those message keys.

The term "plaintext" may refer to text that is in unencrypted or plain form. For example, this may refer to text that can be interpreted by a human or a computer without any processing, such as the phrase "hello, how are you?" Numbers or other symbols may also qualify as plaintext.

The term "ciphertext" may refer to text that is in an encrypted form. For example, this could refer to text that must be decrypted before it can be interpreted by a human or computer. Ciphertexts may be generated using any cryptographic algorithm or cryptosystem, such as RSA or AES.

A "client computer" may refer to a computer that uses the services of other computers or devices, such as server computers. A client computer may connect to these other computers or devices over a network such as the Internet. As an example, a client computer may comprise a laptop computer that connects to an image hosting server in order to view images stored on that image hosting server.

A "cryptographic device" may refer to any device that may perform cryptographic operations, including encryption and decryption. A cryptographic device may participate in distributed or multi-party cryptography. Examples of cryptographic devices include server computers, hardware security modules, desktop computers, laptops, smartphones, smart watches, or other portable electronic devices. A cryptographic device may possess a "secret," or "secret share."

A "proxy device" may refer to a device that acts as a proxy. A proxy device may perform operations on behalf of other devices. For example, a proxy device may receive and transmit messages or other data on behalf of other devices. A proxy device that acts to route communications between other devices in a network of devices may be referred to as a "hub device."

A "numeric identifier" may refer to a number that can be used to identify something, such as a cryptographic device. Mathematical operations, such as addition, subtraction, equality and inequality comparison, etc. may be applied to numeric identifiers.

The term "multi-party computation" may refer to a computation that is performed by multiple parties. Each party, such as a computer, server, or cryptographic device, may have some inputs to the computation. Each party can collectively calculate the output of the computation using the inputs.

The term "secure multi-party computation" may refer to a multi-party computation that is secure. In some cases, "secure multi-party computation refers to a multi-party computation in which the parties do not share information or other inputs with each other. An example is Yao's Millionaires' problem, in which two millionaires want to determine which one is more wealthy without revealing their wealth to one another.

A "secret value" or "secret" may refer to a value or thing kept hidden as part of a cryptographic process. The security of the cryptographic process may rely on the secret value remaining secret. A secret may include a cryptographic key or a "secret share." Exposure of the secret may allow parties other than the intended parties to encrypt or decrypt messages.

A "shared secret" may refer to a secret value or thing shared between multiple parties. For example, a shared secret may be a cryptographic key, divided up such that multiple parties each possess a fraction of that cryptographic key. As an example, two parties may each possess 64 bits of a shared secret comprising a 128 bit cryptographic key.

A "secret share" may refer to a value derived from a shared secret. As an example, a secret share may comprise the first 64 bits of a 128 bit secret value. A secret share may also comprise a secret value combined with a number or other data. In some cases, multiple secret shares may be combined to reproduce a shared secret.

A "hash function" may refer to any function that can be used to map data of arbitrary length or size to data of fixed length or size. A hash function may be used to obscure data by replacing it with its corresponding "hash value." Hash functions may be used to generate "commitments" or "commitment messages" data that may be used to evaluate the integrity of encrypted data.

A "commitment" or "commitment message" may refer to data that may be used to verify that a course of action has been committed to. In the context of cryptography, a commitment may refer to a message that may be used to verify that an encrypted message was not tampered with. Before a message is encrypted, a commitment can be produced based on the message, e.g., via a hash function. This commitment can be sent alongside the encrypted message. Once the message is decrypted, the recipient can generate its own commitment message using the same hash function. The received commitment message and the generated commitment message can be compared to verify the integrity of the encrypted message.

A "pseudorandom function" may refer to a deterministic function that produces an output that appears random. Pseudorandom functions may include collision resistant hash functions and elliptic curve groups. A pseudorandom function may approximate a random oracle, an ideal cryptographic primitive that maps an input to a random output from its output domain. A pseudorandom function can be constructed from a pseudorandom number generator.

A "nonce" or "cryptographic nonce" may refer to a value (e.g., a number) that may be used in a cryptographic process, preferably a limited number of times. A nonce may be derived wholly or in part from other data, such as hash values or commitments. A "random nonce" may comprise a number that has been randomly or pseudorandomly generated, and may be used in conjunction with cryptographic hash functions. Use of a random nonce may prevent some forms of cryptographic attacks, such as the "replay attack."

The "order" of a mathematical group may refer to the number of elements in that group. A "prime order" may refer to an order that is also prime. A "prime order value" may refer specifically to the data or value associated with a prime order.

The "generator" of a mathematical group may refer to a value that can be used to generate each element in the group.

The term "bilinear pairing" may refer to a function that maps inputs from two mathematical groups to a third mathematical group. A bilinear pairing e is bilinear (that is $\forall a,b \in \mathbb{Z}: e(aP, bQ) = e(P,Q)^{ab}$), non-degenerate, and can be computed in an efficient manner. The Weil pairing and the Tate pairing are examples of bilinear pairings.

A "honest verifier zero-knowledge proof of knowledge" (also referred to as an HVZK proof) may refer to a zero-knowledge proof of knowledge performed by an honest verifying entity. An honest verifying entity is an entity (e.g., a client computer) that participates in a cryptographic protocol non-maliciously (e.g., without changing their inputs or outputs) and according to the rules of the protocol. An HVZK proof can be used to verify the legitimacy of information (such as a secret share) without learning anything else about the information.

A "verification value" may refer to data used to verify a computation, fact, or knowledge. An example of a verification value is a non-interactive zero-knowledge proof of knowledge, as discussed above. Another example of a verification value is a cryptographic key. As an example, a private cryptographic key may be used to verify the identity of the person or computer possessing that cryptographic key by signing or encrypting data using that private cryptographic key. A verification value comprising a cryptographic key may be referred to as a "verification key."

A "verification share" may refer to part of a verification value, or data derived from a verification value. A plurality of verification shares may be combined in some manner to produce the corresponding verification value. For example, the product of a collection of verification shares may be equal to the corresponding verification value.

A "confirmation value" may refer to data used to confirm a computation, fact or knowledge. For example, two devices may compare confirmation values in order to confirm that two independently performed computations are equivalent.

A "signature," "digital signature," or "verification signature" may refer to data used to verify the authenticity of data using cryptography. A computer may digitally sign data by encrypting that data using a cryptographic key known only to that computer (i.e., a private key). Other computers may verify the signature by decrypting the data using a publically known cryptographic key corresponding to that computer (i.e., a public key). A verification signature may be used to verify either the source of the signed data or the veracity of the signed data.

A "partial signature" may refer to part of a digital signature. A partial signature, when combined with other partial signatures may reproduce the digital signature. For example, the exclusive-OR of a plurality of partial signatures may be used to reproduce a digital signature.

A "partial computation" may refer to part of a computation. Multiple partial computations may be combined to produce the output of the computation. For example, the volume of multiple solids may comprise partial computations of the total volume of those solids, and those partial computations may be combined via addition. Partial computations may be generated by multiple parties or cryptographic devices participating in a multi-party computation.

A "message" may refer to any data that may be transmitted between two entities. A message may comprise plaintext data or ciphertext data. A message may comprise alphanumeric sequences (e.g., "hello123") or any other data (e.g., image or video files). Messages may be transmitted between computers or other entities.

A "payload" may refer to information in a transmitted message. A payload may exclude automatically generated metadata. A payload may comprise multiple data elements. For example, a payload corresponding to human vital statistics may comprise three data values corresponding to the weight, height, and age of a human.

A "seed value" may refer to an input to a pseudorandom process. For example, a seed value may be a number such as "12034024." A seed value can enable different entities (such as computers) to produce the same output of the pseudorandom process, provided the same seed value is used.

A "key generation seed" may refer to a seed value or other data used to generate a cryptographic key. For example, a key generation seed may be a number such as "12034024." A key generation seed may be used as the input to a random or pseudorandom function to generate the cryptographic key. Key generation functions may be consistent, that is, identical key generation seeds generate identical cryptographic keys.

A "blinding value" may refer to a value used to "blind" (i.e., obscure) another value or data. A blinding value can comprise a random or pseudorandom value. A blinding value can be combined with another value (e.g., via addition, the exclusive-or function, etc.) in order to obscure the other value.

A "log file" may comprise a data file that stores a record of information. For example, a log file may comprise records of use of a particular service, such as distributed cryptography. A log file may contain additional information, such as a time associated with use of the service, an identifier associated with a client using the service, the nature of the use of the service (for example, whether a client is encrypting or decrypting data), etc.

DETAILED DESCRIPTION

I. Introduction

Figure 1:
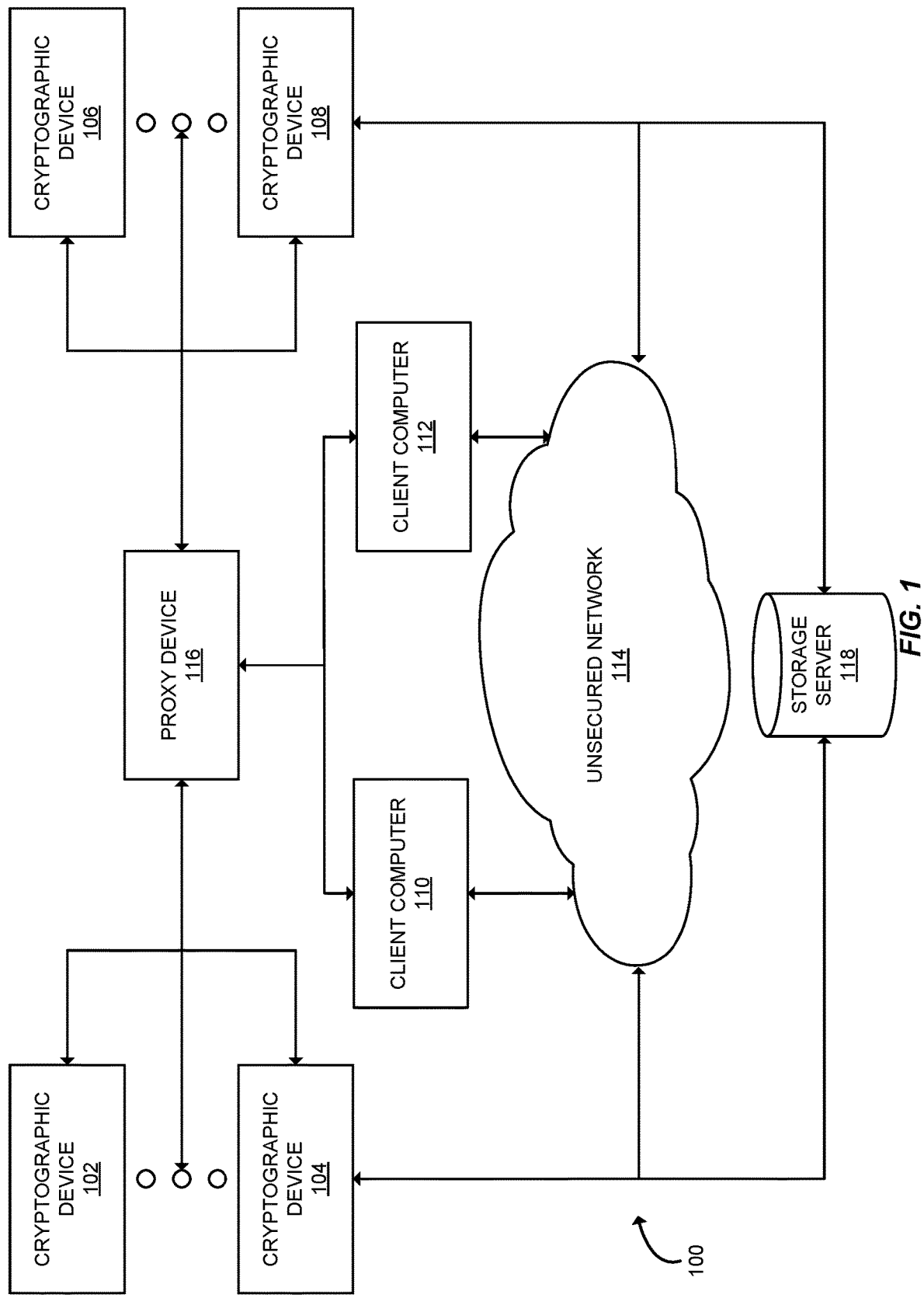
FIG. 1 shows a system block diagram of an exemplary distributed symmetric cryptography system according to some embodiments.

In threshold distributed symmetric cryptography, a threshold number t of participating devices out of some total number of cryptographic devices n are needed to perform symmetric cryptographic operations (e.g., encryption or decryption). Such cryptographic schemes can be referred to as "t-out-of-n" distributed symmetric cryptography. If less than a threshold number of cryptographic devices participate, the cryptographic devices cannot encrypt or decrypt data.

Each cryptographic device can participate in threshold distributed symmetric cryptography using one or more secret shares known only to their respective cryptographic device. These secret shares can be used to generate a session key (i.e., a cryptographic key) that can be used to encrypt or decrypt data. More specifically, in a replicated key scheme, every secret share from a set of secret shares may be needed to generate the session key. These secret shares can be partitioned into subsets and distributed to the cryptographic devices, such that any threshold number of cryptographic devices t collectively possess the entire set of secret shares. As such, a threshold number of cryptographic devices t are able to perform distributed symmetric cryptography.

In many applications of distributed symmetric cryptography, a single device or computer system (sometimes referred to as a "trusted computer," a "trusted server," a "trusted external computer," a "trusted external server", or any similar term) generates and distributes the secret shares to the cryptographic devices. Sometimes the trusted external computer uses a secret value or master key to derive the secret shares. The use of a trusted external computer presents a security vulnerability, as a hacker, fraudster, or cybercriminal could exploit the trusted external computer in order to steal the secret shares. Alternatively, if the operator of the trusted external computer is not trustworthy, the operator could save or otherwise store the secret value or secret shares, then use them to decrypt ciphertexts produced by the cryptographic devices, allowing them access to potentially sensitive information.

Embodiments of the present disclosure address this problem by providing for methods and systems that enable the cryptographic devices to collectively generate and distribute their own secret shares. In doing so, the cryptographic devices do not need to rely on a trusted external computer for their secret shares, thus eliminating the aforementioned vulnerability. Consequently, embodiments improve the security of distributed symmetric cryptography.

As stated above, embodiments are directed to methods and systems for generating and distributing secret shares to cryptographic devices in a distributed manner. The cryptographic devices can later use these secret shares to perform threshold distributed symmetric cryptography, enabling data to be encrypted or decrypted provided that at least a threshold number t of cryptographic devices participate. Methods according to embodiments are described in more detail further below with reference to the figures. However, they are also summarized immediately below.

A plurality of cryptographic devices can be assigned to cryptographic device groups based on any appropriate means. For example, cryptographic devices can be assigned to device groups based on numeric identifiers associated with those devices. A cryptographic device may belong to multiple device groups. The number of cryptographic device groups and the number of cryptographic devices within each device group can be proportional to the total number of cryptographic devices n and the desired threshold number t.

In each device group, one cryptographic device in that device group can be selected to act as a generating device. The generating devices for each device group can be selected using any appropriate means. As an example, the cryptographic device with the lowest numeric identifier in each device group can be selected to act as the generating device for that device group. As an alternative example, the cryptographic devices can perform an automated voting procedure to select the generating device for each group.

The generating device for each device group can generate a secret share (e.g., using a random or pseudorandom number generator) and transmit the secret share to cryptographic devices in the device group. Additionally, the generating devices can generate commitments and digital signatures corresponding to their respective secret shares. The generating devices can transmit these commitments and digital signatures to all cryptographic devices.

Because cryptographic devices may belong to multiple device groups, a cryptographic device may act as a generating device for multiple device groups.

Alternatively, a cryptographic device may act as a generating device in one device group and may act as a non-generating device in another device group. Further, because cryptographic devices may belong to multiple device groups, a cryptographic device may receive multiple different secret shares from multiple generating devices.

Each cryptographic device can verify the digital signatures received from the generating devices. Additionally, some number of cryptographic devices can be selected to act as confirming devices. In some embodiments, a threshold number of cryptographic devices t can act as confirming devices. The confirming devices can use the received commitments to generate confirmation values. These confirmation values can be used to confirm that the generating devices transmitted consistent commitments to all cryptographic devices. The confirming devices can transmit the confirmation values to all cryptographic devices. Each cryptographic device can then verify that the confirmation values are equivalent.

At any time, if a cryptographic device determines a digital signature or confirmation value is invalid, it can alert the other cryptographic devices and abort the secret share generation and distribution protocol. Otherwise, any threshold number of cryptographic devices t can later use their secret shares to perform distributed symmetric encryption or decryption operations.

II. Distributed Symmetric Cryptography Overview

Embodiments of the present disclosure are directed to methods and systems used to generate and distribute secret shares that can be used by cryptographic devices to perform distributed symmetric cryptography. In order to provide context for these embodiments, distributed symmetric cryptography and some related concepts are described below.

Distributed symmetric cryptography can be implemented, in part, using distributed pseudorandom function. A distributed pseudorandom function is a function that can be calculated in a distributed manner (e.g., by multiple participating cryptographic devices) and produces consistent outputs that appear random. The use of distributed pseudorandom functions allow the cryptographic devices to use their secret shares to produce a session key that can be used to perform encryption or decryption without revealing their secret shares in the process.

Cryptographic devices that perform distributed symmetric cryptography may each possess one or more secret shares. In some implementations of distributed symmetric cryptography, these secret shares can be derived from secret values. Alternatively, the secret shares can be generated without derivation from secret values, as described herein with reference to FIGS. 4 and 5.

During the execution of a distributed pseudorandom function, the cryptographic device can use their respective secret shares and one or more input values to generate partial computations. These one or more other input values can comprise, for example, a commitment or hash of a message m that an "initiating device" intends to encrypt. The initiating device could comprise, for example, a client computer that communicates with the cryptographic devices as part of an external cryptography service provided by the cryptographic devices. As an alternative, the initiating device could comprise a cryptographic device that requests the assistance of other cryptographic devices to perform encryption or decryption.

After generating the partial computations, the cryptographic devices can transmit the partial computations to the initiating device. The initiating device can combine these partial computations to calculate the output of the distributed pseudorandom function. In distributed symmetric cryptography, the output could comprise, for example, a session key. As an alternative, the output could comprise a key generation seed that can be used by the initiating device to generate the session key, using, for example, an AES key generation algorithm. The session key can be used to perform encryption or decryption. Alternatively, in "amortized" distributed symmetric cryptography (a variation on distributed symmetric cryptography), a "bulk" session key can be used to derive a plurality of individual "message keys" that can be used to encrypt individual messages.

The following subsections describe concepts and techniques that can be used to implement distributed symmetric cryptography in more detail.

A. Secret Shares

As stated above, cryptographic devices may possess secret shares that can be used to generate session keys, which in turn can be used to perform cryptographic operations. Secret shares can correspond to particular secret sharing schemes. One example is Shamir's secret sharing, other examples include Blakley's scheme, or secret sharing based on the Chinese Remainder Theorem.

Some secret sharing schemes are threshold or "t-out-of-n" secret sharing. In the context of secret sharing, t-out-of-n usually indicates that any t parties (such as cryptographic devices) out of n total parties, possess enough secret shares to reproduce a "secret value" or "shared secret." In some secret sharing schemes, each party may possess one unique secret share, and t secret shares, out of a total of n secret shares are needed to reproduce a "secret value" or "shared secret." In other secret sharing schemes, each party may possess multiple secret shares, such that any t parties collectively possess all of the secret shares, and all of the secret shares may be needed to reproduce the secret value or shared secret. Depending on the implemented t-out-of-n secret sharing scheme, the parties may need to collectively possess t secret shares, or all of the secret shares in order to perform distributed symmetric cryptography.

B. Verification Shares

Optionally, each cryptographic device can possess a verification share. Much like a secret share, a verification share can be used as an input to a distributed pseudorandom function. However, rather than being used to generate cryptographic keys, verification shares can be used to generate partial signatures, which can in turn be combined to generate verification signatures. Verification signatures may comprise cryptographic signatures that can be used to verify that a distributed symmetric encryption process was performed correctly.

Further, in some implementations of distributed symmetric cryptography, verification signatures can be used to determine whether an initiating device (e.g., a client computer) is performing an encryption operation or a decryption operation. Thus verification signatures can be used in part of a ciphertext accountability scheme. For example, a verification signature may be generated by an initiating device during a distributed symmetric encryption operation, and during a distributed symmetric decryption operation, the initiating device may need to present the verification signature to the cryptographic devices. If the initiating device does not present a valid verification signature, the cryptographic devices may not participate in decryption. In this way, the cryptographic devices can determine whether the initiating device is performing encryption or decryption, as well as generally control access to the distributed symmetric cryptography system. In some distributed symmetric cryptography systems, the cryptographic devices may record access to the distributed symmetric cryptography system in a log file. This record may indicate whether the initiating device presented a valid verification signature.

Verification shares may correspond to a verification value, much like secret shares correspond to a secret value. This verification value may be encoded into a polynomial, much like how a secret value can be encoded into a polynomial. The verification value may be reproduced using a threshold number of secret shares. A verification value may correspond to a cryptographic key, such as a private cryptographic key that has a corresponding public (verification key). Using a threshold number of verification shares and a distributed pseudorandom function, cryptographic devices may perform an operation that is equivalent to signature generation using the private cryptographic key, thereby generating a verification signature. The verification signature can be verified at a later time using the corresponding verification key.

C. Pseudorandom and Distributed Pseudorandom Functions

A pseudorandom function is a function that produces an output that appears random with respect to the input. The advantage of using pseudorandom functions is that it is difficult to determine the input given the output, and thus pseudorandom functions can be used to obscure inputs.

In a hypothetical cryptographic application, a secret value S could comprise a cryptographic key. The secret value S could be used to encrypt or decrypt data, when and if it is reconstructed from its constituent secret shares $sk_0$, $sk_1$ . . . $sk_n$. However, this may be undesirable because the secret value S could be stolen and used by a malicious participant after it is reconstructed. Instead, it may be preferable to use the secret value S as an input to a pseudorandom function, then use the output of the pseudorandom function to generate a cryptographic key. In this way the secret value S is not exposed to an attacker or other malicious user.

A distributed pseudorandom function may refer to a pseudorandom function that can be calculated in a distributed manner. As an example, a plurality of cryptographic devices may use their respective secret shares $sk_i$ to calculate a plurality of partial computations. These partial computations may be combined to produce the output of a pseudorandom function. The combination of those partial combinations may be equivalent to the output of a corresponding non-distributed pseudorandom function (e.g., one where a single cryptographic device directly produces the output of a pseudorandom function).

Any pseudorandom function that appears random and is consistent can be used as the basis for a distributed pseudorandom function. Notable examples of pseudorandom functions are hash functions, the advanced encryption standard (AES) cryptosystem and elliptic curve cryptosystems. Elliptic curve cryptography will be described below for the purpose of illustrating some embodiments, however, it should be understood that embodiments can be practiced with any appropriate pseudorandom function.

An elliptic curve is any curve satisfying the equation $y^2=x^3+ax+b$. Elliptic curve cryptography is usually performed using elliptic curves over finite fields. An example of a finite field is integers mod p, where p is a prime number. Integers mod p comprises every integer from 0 to p−1. An elliptic curve group may be defined by its order q, the number of elements within the group. The decisional Diffie-Hellman assumption holds under these elliptic curve groups.

Elliptic curve cryptosystems, like many other cryptosystems, relies on mathematical problems which have computationally infeasible solutions. With elliptic curve cryptography, there is currently no efficient solution to the "elliptic curve discrete logarithm problem." Given an original point A on an elliptic curve and a product point C on an elliptic curve, it is sufficiently difficult to determine a multiplicand point B, such that the point multiplication A*B=C holds. A practical result is that as long as B is kept secret, a message can be converted into a point A and point-multiplied with a point B in order to produce a product point C.

The decisional Diffie-Hellman assumption states that in a multiplicative group G of prime order p with generator g, that for random and independent a and b, the values $g^a$, $g^b$ and $g^{ab}$ all appear to be random elements selected from the group G. In other words, it is difficult to determine the multiplicative relationship between $g^a$, $g^b$ and $g^{ab}$ (i.e., that $g^{ab}$ equals the product of $g^a$ and $g^b$).

Practically, two points on an elliptic curve can be multiplied to produce a third point, and the relationship between the two points and the third point appears random. So if some value can be represented as a point, that value can be point multiplied by another value to produce a third value, and the relationship between those three values appears random. Thus elliptic curves can be used as a pseudorandom functional basis for distributed pseudorandom functions.

D. Implementing Distributed Symmetric Cryptography

This subsection describes how some of the concepts listed above can be combined to perform distributed symmetric cryptography. Cryptographic devices can use elliptic curve cryptography in a distributed matter to encrypt data values using their respective secret shares sk. A data value could comprise, for example, a commitment H(m) comprising a hash of a message m that the initiating device intends to encrypt, or a commitment H(id) comprising a hash of an identifier corresponding to the initiating device. In some embodiments, multiple commitments (e.g., $H_1(m)$, $H_2(m)$) can be encrypted. These encrypted commitments may be referred to as "partial computations." These partial computations can be combined by the initiating device to generate a value that is equivalent to the commitment encrypted using the secret value S, which can be used as a session key by the initiating device to encrypt a message m. Alternatively, the partial computations can be combined by the initiating device to generate a bulk key bk, which can subsequently be used to generate message keys used to encrypt individual messages, using, for example, a bilinear pairing as described further below.

In some implementations of distributed symmetric cryptography, an initiating device can use the output of the distributed pseudorandom function to generate a session key that can be used for encryption and decryption. Provided consistent commitments are used for encryption and decryption, the same cryptographic key can be generated and used for encrypting messages and decrypting corresponding ciphertext.

To summarize, each cryptographic device can possess one or more secret shares. A threshold number of cryptographic devices can participate in a multi-party cryptographic operation. An initiating device may possess one or more messages $m_1, \ldots, m_n$ that the initiating device wants to encrypt. The initiating device can generate a commitment of either a message m or a client identifier id, and transmit it to the cryptographic devices. The cryptographic devices can subsequently generate partial computations corresponding to this commitment and transmit them back to the initiating device. The initiating device can combine these partial computations to produce the output of the distributed pseudorandom function. The output of the distributed pseudorandom function can then be used by the initiating device to derive one or more cryptographic keys.

The preceding example was intended as one non-limiting example of how shared secrets and distributed pseudorandom function may be used to perform distributed symmetric cryptography. Any appropriate pseudorandom function (such as AES, hash functions, etc.) as well as any appropriate secret sharing techniques (e.g., Blakley's scheme, the Chinese Remainder Theorem, etc.) can be used to implement distributed symmetric cryptography.

III. Distributed Cryptographic Network

Distributed symmetric cryptography can be performed by computers, devices, and other systems in a distributed cryptography network. Such a network may include cryptographic devices which can use their secret shares to enable a client computer (or other initiating device) to generate a session key that can subsequently be used to perform encryption or decryption. The cryptographic devices can also communicate with one another in order to collectively generate their respective secret shares. Distributed cryptographic networks are described with reference to FIG. 1 and Section III.A below. Cryptographic devices are described with reference to FIG. 2 and Section III.B below. Client computers are described with reference to FIG. 3 and Section III.C below.

A. System Block Diagram

FIG. 1 shows a system block diagram of an exemplary distributed cryptography network 100 according to some embodiments. The exemplary distributed cryptography network may comprise cryptographic devices 102-108, client computers 110 and 112, unsecured network 114, optional proxy device 116 and optional storage server 118.

Although only four cryptographic devices 102-108 are shown, embodiments can be practiced with any number of cryptographic devices. Likewise, although only two client computers 110 and 112 are shown, distributed symmetric cryptography as a service can be practiced with any number of client computers.

The computers and devices of FIG. 1 may communicated with each other via a communication network (such as unsecured network 114), which can take any suitable form, and may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers and devices may be transmitted using a secure communications protocol, such as, but not limited to, File Transfer Protocol (FTP); HyperText Transfer Protocol (HTTP); Secure HyperText Transfer Protocol (HTTPS); Secure Socket Layer (SSL), ISO (e.g., ISO 8583) and/or the like.

The distributed cryptography network may enable initiating devices, such as client computers 110 and 112 to encrypt messages or decrypt ciphertext using cryptographic materials (secret shares) securely stored by cryptographic devices 102-108. Client computers 110 and 112 may communicate with cryptographic devices 102-108 either directly, via a network (such as the Internet or unsecured network 114) or via optional proxy device 116. The client computers 110-112 may possess messages to be encrypted ("plaintext messages" or "plaintext") or decrypted ("ciphertext messages" or "ciphertext"), as well as hardware, software, code, or instructions that enable client computers 110-112 to participate in distributed symmetric cryptographic processes. A client computer may comprise an example of an "initiating device," a computer or other device that initiates a distributed symmetric cryptographic process. However, it should be understood that distributed symmetric cryptography can be performed without client computers. For example, the cryptographic devices 102-108 could perform distributed symmetric cryptography on their own behalf, or on behalf of an entity that is not a client (such as an entity that operates the cryptographic devices 102-108).

Each cryptographic device 102-108 may possess one or more secret shares out of some total number of secret shares and may optionally possess a verification share. Secret shares and verification shares may correspond to secret values and verification values respectively, as described above in Section II. The verification value may correspond to a verification key that can be used by cryptographic devices 102-108 to verify verification signatures produced using the verification shares. The secret shares can be distributed to cryptographic devices 102-108 such that any threshold number of cryptographic devices t collectively possess the total number of secret shares, enabling those t cryptographic devices to perform distributed symmetric cryptographic operations. Likewise, t cryptographic devices may possess enough verification shares to allow the generation of a verification signature. The threshold number t may be less than the total number of cryptographic devices 102-108. For example, if there are twenty cryptographic devices 102-108, the threshold number t may be 14 cryptographic devices, or any other appropriate number of cryptographic devices.

During a secret share generation and distribution process (as described below with reference to Section IV), each cryptographic device 102-108 may assume a role in the generation and distribution of secret shares. For example, some cryptographic devices can act as generating devices and some cryptographic devices can act as confirming devices. The cryptographic devices may also be assigned to cryptographic device groups. A cryptographic device can belong to multiple device groups. As an example, cryptographic devices 102 and 104 could be assigned to a first device group, while cryptographic devices 106-108 could be assigned to a second device group. Cryptographic device 102 can act as the generating device for the first device group, and cryptographic device 106 can act as the generating device for the second device group. Cryptographic devices 104 and 108 can act as confirming devices that verify that the secret share generation and distribution process was performed correctly.

The cryptographic devices 102-108 may be organized into a cryptographic device network. This cryptographic device network may comprise a local area network connected to a larger computer network, such as the Internet or unsecured network 114. Communications between the cryptographic device network and external computers (e.g., client computers 110 and 112) may be mediated by the proxy device 116, which may comprise a web server that communicates with client computers 110 and 112 via any appropriate means (e.g., an Application Programming Interface (API)).

A cryptographic device network may be organized into any appropriate networking structure. For example, a cryptographic device network may comprise a "chain" structure, whereby the cryptographic devices are organized into a linear sequence of cryptographic devices. Communications from a client computer 110 to one cryptographic device (e.g., cryptographic device 108) may pass through all the preceding cryptographic devices (e.g., cryptographic device 102-106) and proxy device 116 before reaching the intended recipient. Alternatively, the cryptographic device network may comprise a "tree" structure, with different branches comprising different collections of cryptographic devices (e.g., one branch may comprise cryptographic devices 102 and 104, and another branch may comprise cryptographic devices 106 and 108). A cryptographic device network may comprise any number of proxy devices 116, which may act as proxies to cryptographic devices or other proxy devices 116.

As described herein, cryptographic devices 102-108 may (prior to performing distributed symmetric cryptography) perform methods that enables the cryptographic devices 102-108 to generate and distribute secret shares without the need of a trusted external server. These methods can involve cryptographic devices 102-108 communicating with one another. These communications may be mediated or transmitted via optional proxy device 116.

Unsecured network 114 may comprise a computer network over which client computers 110 and 112 communicate with one another. Unsecured network 114 may comprise a network such as the Internet. A client computer such as client computer 110 may communicate with cryptographic devices 102-108 in order to encrypt a message, enabling client computer 110 to securely transmit the encrypted message via unsecured network 114. For example, client computer 110 can transmit an encrypted message to client computer 112, which can then communicate with cryptographic devices 102-108 in order to decrypt the message.

Storage server 118 may comprise any database server or other appropriate server system that can store data on behalf of cryptographic devices 102-108, client computers 110-112 and any other appropriate computers or devices. As an example, this data may include encrypted messages (ciphertexts) as well as any information that may enable client computers 110-112 and cryptographic devices 104-108 to decrypt these ciphertexts (including commitments, as described in Section V below).

As an example, the distributed cryptography network 100 may be used to securely manage and store medical records for hospitals. In this example, client computers 110 and 112 may comprise computer systems that manage medical records for a first hospital and a second hospital respectively. These hospitals may not be equipped to encrypt medical records on their own. As such, in order to comply with patient confidentiality rules, these hospitals may use the cryptography service provided by cryptographic devices 102-108 in order to encrypt medical records before storing them in a medical record database (e.g., storage server 118).

If a patient is being transferred from the first hospital to the second hospital, the client computer corresponding to the first hospital (e.g., client computer 110) can transmit the encrypted medical record to the client computer corresponding to the second hospital (e.g., client computer 112). The client computer corresponding to the second hospital can decrypt the medical record by using the distributed cryptography service provided by cryptographic devices 102-108 or a different set of cryptographic devices that are in the cryptographic device network. When one of the hospitals needs to access a medical record, (e.g., prior to a meeting between a doctor and a patient corresponding to the medical record), client computer 110 or 112 can communicate with cryptographic devices 102-108 in order to decrypt the medical record. In this way the hospitals can use the distributed symmetric cryptography system 100 to securely store, access, and transmit sensitive data such as medical records.

B. Cryptographic Device

Figure 2:
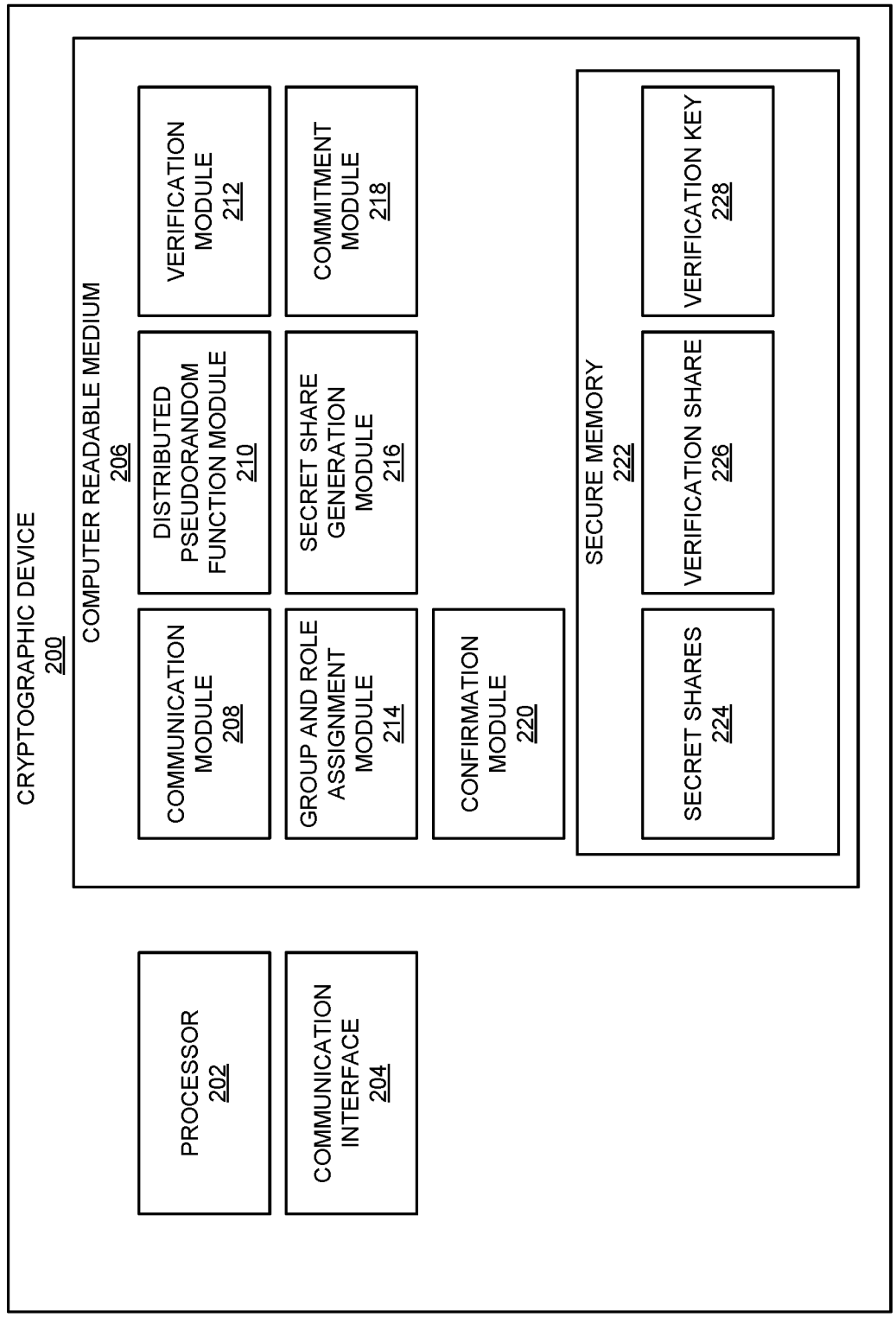
FIG. 2 shows a system block diagram of an exemplary cryptographic device according to some embodiments.

FIG. 2 displays an exemplary cryptographic device 200 according to some embodiments. The cryptographic device 200 may comprise a computer or other device in a cryptographic device network. In some embodiments, cryptographic device 200 may comprise a server computer. Cryptographic device 200 may perform a threshold secret share generation process with other cryptographic devices in order to generate one or more secret shares 224. Cryptographic device 200 may store the secret shares 224 in a secure memory 222, along with a verification share 226 (which can be used to generated verification signatures) and a verification key 228 (which can be used to verify verification signatures).

During distributed symmetric cryptographic operations, the one or more secret shares 224 and the verification share 226 may be used by the cryptographic device to generate partial computations and partial signatures using a distributed pseudorandom function. The partial computations may be used by an initiating device (e.g., a client computer) to generate a session key. The session key can be used by the client computer to encrypt or decrypt messages. Cryptographic device 200 may comprise a processor 202, a communication interface 204, and a computer readable medium 206.

1. Processing, Communicating, and Storing

Processor 202 may comprise any suitable data computation device or devices. Processor 202 may be able to interpret code and carry out instructions stored on computer readable medium 206. Processor 202 may comprise a central processing unit (CPU) operating on a reduced instructional set, and may comprise a single or multi-core processor. Processor 202 may include an arithmetic logic unit (ALU) and a cache memory. These components may be used by processor 202 in executing code or other functions.

Communications interface 204 may comprise any interface by which cryptographic device 200 may communicate with other computers or devices. Examples of communication interfaces include wired interfaces, such as USB, Ethernet, or FireWire. Examples also include interfaces used for wireless communication, such as a Bluetooth or Wi-Fi receiver. Cryptographic device 200 may possess multiple communication interfaces 204, such as a micro USB port, an Ethernet port, a cellular receiver, a Bluetooth receiver, etc.

Cryptographic device 200 may communicate with other devices or computers using communication interface 204 via one or more secure and authenticated point-to-point channels. These channels may use standard public-key infrastructure. For example, cryptographic device 200, acting as a generating device for a particular device group, can exchange symmetric keys with other cryptographic devices (i.e., non-generating (receiving) devices) via their communication interfaces. As another example, cryptographic device 200 and an initiating device (e.g., a client computer) may exchange a symmetric key via their communication interfaces. These key exchanges may comprise, for example, Diffie-Hellman key exchanges.

After exchanging cryptographic keys, cryptographic device 200 and the client computer or other cryptographic device may communicate over a public channel (such as an unsecured network) using a standard authenticated encryption scheme to encrypt any message with the cryptographic key. Further authentication methods can also be used, e.g., digital signatures. By performing this key exchange, communications between cryptographic device 200 and a cryptographic device or client computer may be encrypted, allowing cryptographic device 200 and the client computer or other cryptographic device to communicate securely over an unsecured network.

Computer readable medium 206 may comprise hardware that may possess or store code, data or instructions that can be interpreted by processor 202. Computer readable medium 206 may store or otherwise comprise a number of software modules, including a communication module 208, a distributed pseudorandom function module 210, a verification module 212, a group and role assignment module 214, a secret share generation module 216, a commitment module 218, a confirmation module 220, and secure memory 222. The secure memory element may store a secret share 224, a verification share 226, and a verification key 228.

2. Communication Module

Communication module 208 may comprise or include code or instructions that may be used by processor 202 to enable the cryptographic device 200 to communicate with other computers or devices, including client computers, proxy devices, and other cryptographic devices, using any appropriate communications protocol. Communication module 208 may comprise code or instructions, executable by the processor 202 for transmitting generated secret shares to cryptographic devices in cryptographic device groups (e.g., when cryptographic device 200 is acting as a generating device), receiving secret shares (e.g., when cryptographic device 200 is acting as a non-generating member of a device group), and receiving and transmitting commitments and digital signatures.

Additionally, communication module 208 may comprise code or instructions, executable by the processor 202 for receiving requests for cryptographic services from initiating devices (e.g., requests to perform encryption or decryption). These requests may include message commitments generated using a message and a hash function. The message commitment may be used to generate a partial computation that can be transmitted back to the initiating device, which can then use the partial computation and a plurality of other partial computations to generate a session key used to perform cryptography. The cryptographic device 200 can use communication module 208 to receive or transmit any data associated with servicing these requests. For example, receive commitments and verification signatures from client computers and transmit partial computations and partial signatures to client computers.

Further, communication module 208 may enable the cryptographic device 200 to receive a plurality of confirmation values from a plurality of confirming devices. The cryptographic device can use these confirmation values (and confirmation module 220) to verify that generating devices transmitted consistent commitments to the cryptographic devices in a cryptographic device network. Alternatively, if cryptographic device 200 is acting as a confirming device, cryptographic device 200 can use communication module 208 to transmit a confirming value to the other cryptographic devices in the cryptographic device network. Additionally, the cryptographic device 200 can use communication module 208 to transmit and receive commitments and zero-knowledge proofs, to or from other cryptographic devices.

3. Distributed Pseudorandom Function Module

The distributed pseudorandom function module 210 may comprise code for the purpose of evaluating pseudorandom functions (PRFs) or distributed pseudorandom functions (DPRFs). This may include, for example, performing cryptographic operations associated with elliptic curve cryptography, block ciphers such as AES, or hash functions such as SHA-2.

As an example, the distributed pseudorandom function module 210 may comprise code that may be used by processor 202 in order to implement elliptic curve cryptography under the decisional Diffie-Hellman assumption. Elliptic curve cryptography may be used to generate one or more partial computations based on one or more commitments (e.g., message commitments based on messages m) and one or more secret shares 224. If the cryptographic device 200 generates multiple partial computations, the partial computations may be combined into a single partial computation, and transmitted to a client computer. The client computer can use this partial computation, along with other partial computations received from other cryptographic devices to produce a cryptographic key that can be used to encrypt a message or decrypt ciphertext, for example, as described above in Section II.

Thus processor 202 may use the distributed pseudorandom function module 210 in order to perform elliptic curve cryptography using the commitment or commitments as inputs. Alternatively, the processor 202 may use the distributed pseudorandom function module 210 to generate one or more commitments using a message m and optionally one or more random values r as inputs. The one or more commitments may be converted into one or more points in an elliptic curve group, which may each be point multiplied by a respective secret multiplicand (e.g., secret shares 224) to produce product points. The product points may comprise partial computations that may be combined into a single partial computation (e.g., by calculating the product) and transmitted to an initiating device (e.g., a client computer). The client computer can then combine the partial computations in order to generate a session key.

Additionally, the distributed pseudorandom function module 210 may comprise code that may be used by processor 202 in order to perform operations associated with pairing-based cryptography, including the evaluation of bilinear mappings. For example, the cryptographic device could use a bilinear mapping to generate a nonce based on a hash of an identifier and a hash of a commitment, then use that nonce as the input to a cryptographic function, such as an elliptic curve cryptography function.

4. Verification Module

Verification module 212 may comprise code or instructions, executable by processor 202 for generating partial signatures and verifying verification signatures. Verification signatures may be used by cryptographic device 200 to determine whether a client computer is making legitimate use of the distributed symmetric cryptography system, and whether the client computer is using the distributed symmetric cryptography system to encrypt or decrypt data. The presence of a valid verification signature may indicate that the client computer is decrypting data, as the cryptographic device 200 may verify the verification signature during distributed symmetric decryption.

Verification module 212 may use a verification share 226 (stored in secure memory 222) in order to generate a partial signature using one or more commitments received from a client computer. The cryptographic device 200 can use verification module 212 to generate the partial signature by encrypting the commitment using its corresponding verification share 226. Alternatively, the cryptographic device 200 can use verification module 212 to generate the partial signature by encrypting the commitment using its corresponding verification share 226 using any appropriate form of homomorphic cryptography. As another alternative, verification module 212 may generate the partial signature using one or more commitments, the verification share 226 and an appropriate message authentication code (MAC) algorithm.

The cryptographic device 200 may transmit the partial signature to the client computer, which may also receive a number of other partial signatures from other cryptographic devices. The client computer may combine these partial signatures to generate a verification signature. The client computer may then store the verification signature. At another time, when the client computer wants to decrypt a ciphertext, the client computer may transmit the verification signature to cryptographic device 200. Cryptographic device 200 may then use the verification module 212 and a verification key 228 to verify the verification signature. Verification key 228 may correspond to a verification value used to produce verification share 226 and other verification shares belonging to other cryptographic devices. In some embodiments, verification key 228 and the verification value may comprise an asymmetric key pair. As an example, verification key 228 may comprise a public cryptographic key and the verification value corresponding to verification share 226 may comprise a private cryptographic key.

A verification signature may comprise one or more commitments $H_n(m)$ encrypted using the verification value. The verification signature may be decrypted using verification key 228 to produce the one or more commitments $H_n(m)$. Cryptographic device 200 may use verification module 212 in order to decrypt the verification signature using verification key 228 and compare the resulting commitment (or commitments) to a commitment received from a client computer. If the two commitments match, the verification signature may be legitimate. Alternatively, cryptographic device 200 may use verification module 212 to verify a verification signature using any other appropriate method, such as a method based off pairing friendly elliptic curves, message authentication codes (MACs), hashed message authentication codes (HMACs) etc. Example techniques for verifying signatures can be found in: [1] Boldyreva A. (2003) "Threshold Signatures, Multisignatures and Blind Signatures Based on the Gap-Diffie-Hellman-Group Signature Scheme." In: Desmedt Y. G. (eds) Public Key Cryptography—PKC 2003. PKC 2003. Lecture Notes in Computer Science, vol 2567. Springer, Berlin, Heidelberg; [2] Victor Shoup. 2000. "Practical threshold signatures." In Proceedings of the 19th international conference on Theory and application of cryptographic techniques (EUROCRYPT 00). Springer-Verlag, Berlin, Heidelberg, 207-220; and [3] Naor M., Pinkas B., Reingold O. (1999) Distributed Pseudorandom Functions and KDCs. In: Stern J. (eds) Advances in Cryptology—EUROCRYPT '99. EUROCRYPT 1999. Lecture Notes in Computer Science, vol 1592. Springer, Berlin, Heidelberg.

5. Group and Role Assignment Module

The group and role assignment module 214 may comprise code or instructions, executable by processor 202, for assigning cryptographic device 200 to cryptographic device groups and assigning a role to the cryptographic device 200. These roles may comprise, for example, acting as a generating device, acting as a non-generating device, acting as a confirming device, etc. In some embodiments, the group and role assignment module 214 may explicitly indicate the device groups and role associated with cryptographic device 200. As an example, the group and role assignment module 214 may indicate to cryptographic device 200 that it is a member of device groups 1, 2, and 3, is the generating device for device group 1, and acts as a verifying device.

Alternatively, the group and role assignment module 214 may comprise functional code that enables the cryptographic device 200 to determine its corresponding device groups and role(s). For example, cryptographic device 200 can use group and role assignment module 214 to compare a numeric identifier associated with cryptographic device 200 to other numeric identifiers associated with other cryptographic devices in a particular device group. If cryptographic device 200 possesses the lowest (or highest) numeric identifier, it can assign itself to act as the generating device for that device group. Alternatively, the group and role assignment module 214 may be used by the cryptographic device 200 to perform a voting process with other cryptographic devices in a given cryptographic device group, where the cryptographic device with the most votes can be selected to act as the generating device.

6. Secret Share Generation Module

Secret share generation module 216 may comprise code or instructions, executable by processor 202 for generating secret shares. This may include, for example, code that enables cryptographic device 200 to generate a secret share for a device group (when acting as a generating device. Secret share generation module 216 may enable the cryptographic device 200 to generate a secret share using a random or pseudorandom number generator.

7. Commitment Module

Commitment module 218 may comprise code or instructions, executable by processor 202 for generating commitments of secret shares. These may include secret shares generated using secret share generation module 216. In some embodiments, generating commitments of secret shares may comprise hashing secret shares using a hash function H, and using the resulting hash values as the commitment. Alternatively, the commitment module 218 may comprise code enabling the cryptographic device 200 to generate commitments such as ElGamal commitments, or any other appropriate commitments.

Commitment module 218 may also comprise code, executable by processor 202 for verifying that a commitment generated by the cryptographic device 200 is consistent with a digital signature associated with that commitment. In doing so, the cryptographic device 200 can confirm that the commitment is associated with a particular generating device. This verification process can comprise decrypting a digital signature using a public key corresponding to the generating device that generated the commitment, then comparing the decrypted digital signature to the commitment. If they match, the cryptographic device can conclude that the commitment was generated by the cryptographic device corresponding to the public key.

8. Confirmation Module

Confirmation module 220 can comprise code or instructions, executable by processor 202 for generating and verifying confirmation values $a_i$. These confirmation values can be used by the cryptographic device 200 and other cryptographic devices to confirm that the secret share distribution process was executed honestly by all participating cryptographic devices. A cryptographic device that generates a confirmation value $a_i$ may be referred to as a "confirming device."

If cryptographic device 200 is acting as a confirming device, cryptographic device 200 can use confirmation module 220 to generate a confirmation value based on commitments generated by generating devices, which can include a commitment generated by cryptographic device 200 (if cryptographic device 200 is acting as a generating device). This can be accomplished by concatenating the commitments, thereby generating a concatenated value, a data element comprising all the concatenated commitments. Cryptographic device 200 can then generate the confirmation value $a_i$ by hashing the concatenation using a hash function, which may be the same or different than a hash function used to generate the commitments themselves.

Additionally, cryptographic device 200 can use confirmation module 220 to verify that confirmation values $a_i$ received from the confirming devices are equivalent. In doing so, cryptographic device 200 can conclude that each cryptographic device in the cryptographic device network received the same set of commitments, and thus no cryptographic device behaved dishonestly with respect to commitment generation.

9. Secure Memory

Secure memory 222 may comprise a memory region of computer readable medium 206 or a standalone memory element. Secure memory 222 may store sensitive cryptographic materials in such a way that they are difficult to retrieve by an unauthorized outsider (e.g., a hacker). As an example, data stored in secure memory 222 may be stored in encrypted form. The secure memory 222 may store one or more secret shares 224. Additionally, secure memory 222 may store a verification share 226, as well as a verification key 228 corresponding to the verification share. Cryptographic device 200 may use secret shares 224 to generate a partial computation that is used to generate a cryptographic session key. Likewise, cryptographic device 200 may use verification share 226 to derive a partial signature used to generate a verification signature. Cryptographic device 200 may use verification key 228 to verify a verification signature generated from a plurality of partial signatures

C. Client Computer

As described above, a client computer may comprise a computer system that communicates with a distributed symmetric cryptography system (e.g., a cryptographic device network) in order to encrypt messages or decrypt ciphertext. Thus a client computer is an example of an initiating device, a device that can initiate distributed symmetric cryptography. A client computer may comprise a personal computer or a communication device associated with a user. These devices may include, for example, laptops, desktop computers, smartphones, tablets, smart watches, PDAs, etc. A client computer may also comprise a server computer or mainframe computer associated with an organization (e.g., a business).

Although client computers are not involved in the generation or distribution of secret shares, they are described here in order to provide context relating to the use of secret shares, particularly the performance of distributed symmetric cryptography as a service.

Figure 3:
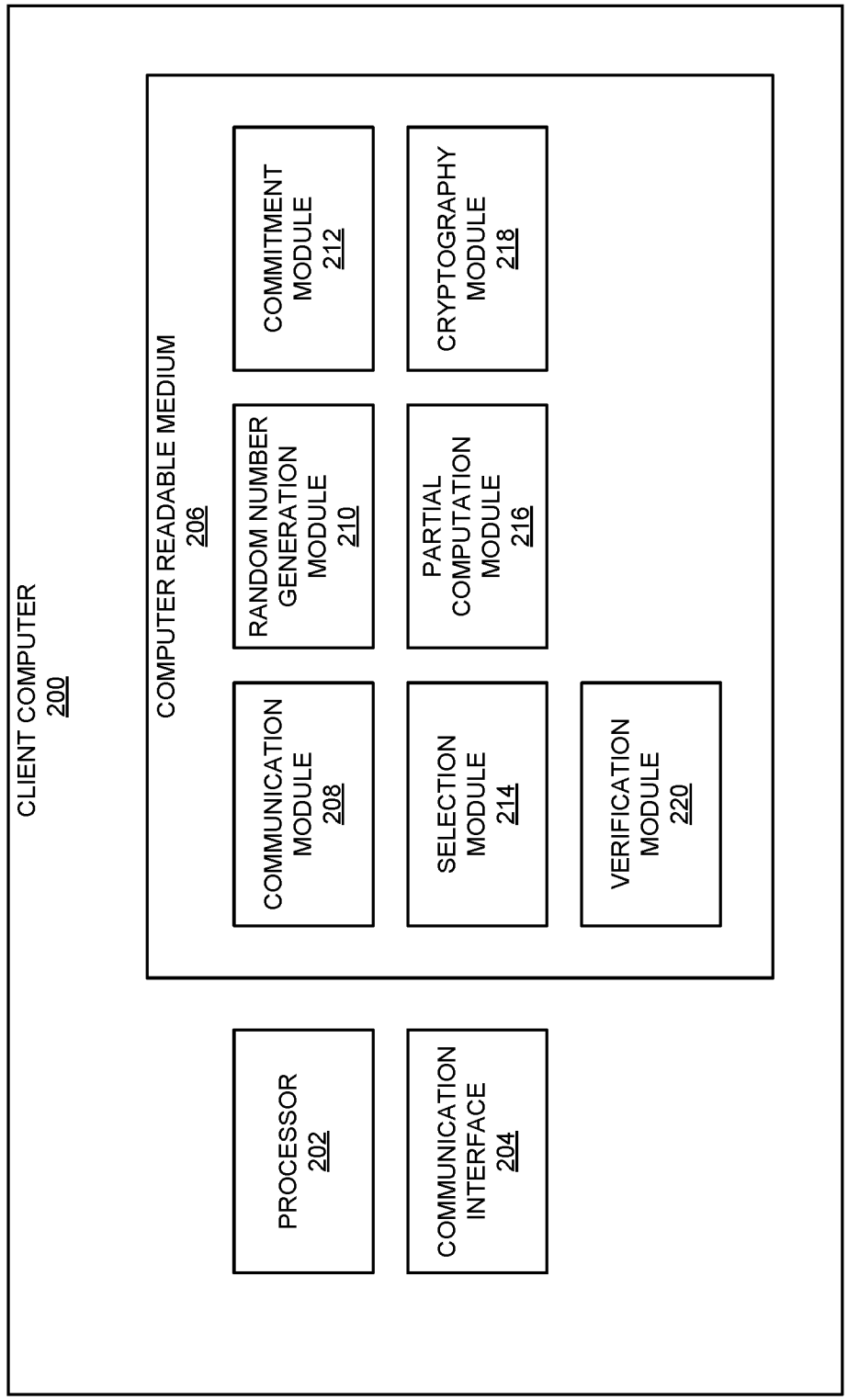
FIG. 3 shows a system block diagram of an exemplary client computer according to some embodiments.

FIG. 3 shows an exemplary client computer 300. Client computer 300 may comprise a processor 302, a communication interface 304, and a computer readable medium 306.

1. Processing, Communicating, and Storing

Processor 302 may comprise any suitable data computation device or devices. Processor 302 may be able to interpret code and carry out instructions stored on computer readable medium 306. Processor 302 may comprise a central processing unit (CPU) operating on a reduced instructional set, and may comprise a single or multi-core processor. Processor 302 may include an arithmetic logic unit (ALU) and a cache memory, these components may be used by processor 302 in executing code or other functions.

Communication interface 304 may comprise any interface by which client computer 300 may communicate with other computers or devices. Examples of communication interfaces include wired interfaces, such as USB, Ethernet, or FireWire. Examples also include interfaces used for wireless communication, such as a Bluetooth or Wi-Fi receiver. Client computer 300 may possess multiple communication interfaces 304. As an example, a client computer 300 comprising a smartphone may communicate through a micro USB port, a cellular receiver, a Bluetooth receiver, and a Wi-Fi receiver.

Client computer 300 may communicate with other devices or computers, using communication interface 304 via one or more secure and authenticated point-to-point channels. These channels may use standard public-key infrastructure. For example, client computer 300 and a cryptographic device may exchange a symmetric key and/or key shares via their communication interfaces. This exemplary key exchange may comprise a Diffie-Hellman key exchange. After exchanging cryptographic keys, client computer 300 and the cryptographic devices may communicate over a public channel (such as an unsecured network) using a standard authenticated encryption scheme to encrypt any message with the cryptographic key. Further authentication methods can also be used, e.g., digital signatures.

Computer readable medium 306 may comprise hardware that may possess code, data, or instructions that can be interpreted by processor 302. Computer readable medium 306 may store or otherwise comprise a number of software modules, including a communication module 308, a random number generation module 310, a commitment module 312, a selection module 314, a partial computation module 316, a cryptography module 318, and a verification module 320.

2. Communication Module

Communication module 308 may comprise or include code, instructions, routines, subroutines, etc., that may be used by processor 302 in order to enable the client computer 300 to communicate with other computers or devices, including other client computers, cryptographic devices, and trusted external servers, using any appropriate communications protocol. Communication module 308 may comprise code or instructions, executable by the processor 302 for sending, receiving, formatting, and interpreting requests, messages, payloads and other data.

Communication module 308 may comprise code enabling the client computer 300 to transmit requests for cryptographic services (e.g., encryption or decryption) to a plurality of client computers. These requests may include commitments, verification signatures, random values, hashes of identifiers, and other alike data. Additionally, communication module 308 may comprise code enabling the client computer 300 to format a payload comprising a ciphertext and any additional information that can be used to generate a cryptographic key. Further, communication module 308 may comprise code enabling the client computer 300 to transmit the payload to another client computer, a storage server, or any other recipient. Likewise, communication module 308 may comprise code enabling the client computer 300 to receive and interpret payloads, messages, requests, etc. For example, the client computer 300 can use communication module 308 to determine which element in a payload is a ciphertext, which element is a commitment, etc.

3. Random Number Generation Module

Random number generation module 310 may comprise or include code, instructions, routines, subroutines, etc., that may be used by processor 302 to generate random or pseudorandom numbers. These random number may include cryptographically secure pseudorandom numbers, and the code may comprise one or more pseudorandom number generation algorithms that meet the requirements for cryptographic security. As an example, these requirements may include passing the "next bit test" and passing a "state compromise extension test." Examples of cryptographically secure random number generators include the Yarrow, ChaCha20, and Fortuna algorithms, among others.

Random number generation module 310 may communicate with other modules or hardware in client computer 300 for the purpose of generating random or pseudorandom numbers. As an example, random number generation module 310 may retrieve the system time (e.g., current year, month, day hour, etc.) in order to seed a pseudorandom number generation algorithm.

Random or pseudorandom numbers may be used to "blind" (i.e., obscure) messages for the purpose of encryption or generating commitments. A message may be combined in some manner with a random or pseudorandom number in order to obscure the message. As an example, a message "hello" may be concatenated with a random number 12345 to produce the blinded message "hello12345." Alternatively, the bitwise exclusive-OR function (XOR) may be used to blind a message using a random number. By blinding messages with random numbers, client computer 300 may protect itself against some cryptographic attacks, including replay attacks. Accordingly, rather than generating a first commitment or second commitment H(m) based solely on a message m, client computer 300 may generate a commitment based on a message and a random value (e.g., H(m|r)). Additionally, instead of encrypting a message m, client computer 300 may encrypt the message m and a random value r generated using random number generation module 310.

4. Commitment Module

Commitment module 312 may comprise code or instructions used by processor 302 for selecting hash functions, generating commitments using hash functions, and identifying or determining hash functions based on hash indicators. Notably, these commitments are different from the commitments used by the cryptographic devices when generating secret shares. Client computers such as client computer 300 use commitments in order to generate a session key (used to encrypt or decrypt data) and in order to verify that data was decrypted correctly. By contrast, cryptographic devices use commitments in order to verify that the secret shares generated by the cryptographic devices were generated and distributed correctly.

Commitment module 312 may comprise a list or repository of different hash functions (e.g., SHA-256, SHA3, BLAKE2, etc.) that can be used to generate commitments. Commitment module 312 may comprise code enabling the processor 302 to select any number of hash functions from this list or repository. In some embodiments, commitment module 312 may comprise code enabling the random selection of hash functions. In others, commitment module 312 may comprise code enabling selection of hash functions according to any appropriate criteria (e.g., based on user preference, a security score, etc.)

Commitment module 312 may comprise code enabling the processor to execute the selected hash functions using messages and random values as inputs. The resulting hash values may be used by the client computer 300 as commitments. The commitment module 312 may additionally comprise code enabling the client computer 300 to verify the correctness of a decrypted message using the commitments. For example, client computer 300 can use the commitment module 312 to verify that a decrypted message m is consistent with a message commitment. If commitments produced using decrypted ciphertext match commitments produced using the corresponding plaintext, the client computer can determine that a message was not modified during encryption.

Further, commitment module 312 may comprise code enabling the processor 302 to identify or determine hash functions based on hash indicators. Hash indicators may comprise identifiers that uniquely identify a particular hash function. For example, the name of a hash function (e.g., "BLAKE2") may be used to identify the corresponding hash function. The client computer 300 may use commitment module 312 to identify the hash functions used to generate one or more commitments in order to verify those commitments were generated correctly.

5. Selection Module

Optional selection module 314 may comprise code or instructions used by processor 302 for selecting a threshold number of cryptographic devices/from cryptographic devices in the cryptographic device network. As stated above, t may correspond to the number of cryptographic devices needed to perform distributed symmetric cryptography. In some embodiments, client computer 300 may not select cryptographic devices from cryptographic devices in the cryptographic device network. Instead, client computer 300 may communicate with a proxy device and the proxy device may perform the selection process. Alternatively, the participating cryptographic devices may be pre-selected or static. As such, selection module 314 may be optional.

As an example, selection module 314 may comprise code implementing a random selection algorithm. The selection module 314 could include a list of cryptographic devices in the cryptographic device network. The selection module 314 could select randomly and without replacement from the list until a threshold number of cryptographic devices are selected. Alternatively, selection module 314 may comprise code that enables rule-based cryptographic device selection. For example, the selection module 314 may determine a threat score associated with each cryptographic device. The threat scores may correspond to a likelihood that a given cryptographic device has been compromised by a hacker or malicious user. The selection module 314 may select a threshold number of cryptographic devices with the lowest threat scores, or randomly select from cryptographic devices with a threat score under a certain value.

As another alternative, the selection module 314 may comprise code enabling the selection of cryptographic devices based on computational load. Some cryptographic devices in the cryptographic device network may already be performing distributed symmetric cryptography on behalf of other client computers, and as a result, may have a higher computational load. The client computer 300 may use selection module 314 in order to select a threshold number of cryptographic devices with a lower computational load in order to improve the throughput of the distributed symmetric cryptography system.

6. Partial Computation Module

Partial computation module 316 may comprise code or instructions that enable processor 302 to manipulate or process partial computations and intermediate computations in order to perform distributed symmetric cryptography. This may include generating intermediate computations based on partial computations and combining partial computations to generate a cryptographic key or a key generation seed. Additionally, partial computation module 316 may comprise code enabling processor 302 to generate verification signatures based on partial signatures.

Partial computation module 316 may comprise code enabling the combination of partial computations and partial signatures using any appropriate methods, functions, or algorithms. As examples, partial computations may be combined by calculating the sum or product (or any other combination) of the partial computations. Partial computation module 316 may also comprise code enabling polynomial interpolation, such as the calculation of Lagrange coefficients. These Lagrange coefficients may correspond to partial computations. Additionally, partial computation module 316 may comprise code enabling exponentiation and modular exponentiation. These code or instructions may be used by the client computer 300 to generate a session key or key generation seed based on partial computations. Client computer 300 can use the cryptography module 318 to input a key generation seed into a key generation algorithm in order to produce a cryptographic key that can be used to encrypt a message or decrypt ciphertext.

Likewise, partial computation module 316 may comprise code enabling the client computer 300 to generate verification signatures from partial signatures, using techniques similar to the those described above with reference to partial computations.

7. Cryptography Module

Cryptography module 318 may comprise code or instructions enabling processor 302 to generate cryptographic keys and perform other cryptographic operations, including the encryption of messages and decryption of ciphertext using cryptographic keys. These cryptographic keys may be generated from key generation seeds. Key generation may depend on the particular cryptosystem being used to perform cryptography. For example, for an "AES-128-CBC" cryptosystem (an AES block cipher with a 128 bit key operating in cipher block chaining mode), a key generation algorithm may accept a passphrase or key generation seed as an input and produce a 128 bit key for an AES block cipher. As examples, client computer 300 can use cryptography module 318 to encrypt a message using a (cryptographic) session key, thereby generating a ciphertext, or decrypt a ciphertext using a session key, thereby generating a message.

Additionally, client computer 300 may use cryptography module 318 to perform functions associated with pairing-based cryptography, including the evaluation of bilinear pairings. The client computer 300 may use bilinear pairings in order to map bulk keys to individual message keys used to encrypt or decrypt messages.

8. Verification Module

Verification module 320 may comprise code or instructions, executable by processor 302 for verifying partial computations using check values. Each check value may correspond to a secret share stored by a cryptographic device in a cryptographic device network. Client computer 300 may use the code or instructions stored in verification module 320 to execute an honest verifier zero knowledge (HVZK) proof in order to verify the legitimacy of the partial computations. Verification module 320 may comprise code or instructions enabling any appropriate implementation of the HVZK proof, including Schnorr's protocol and Fiat-Shamir.

IV. Generating and Distributing Secret Shares

Figure 4:
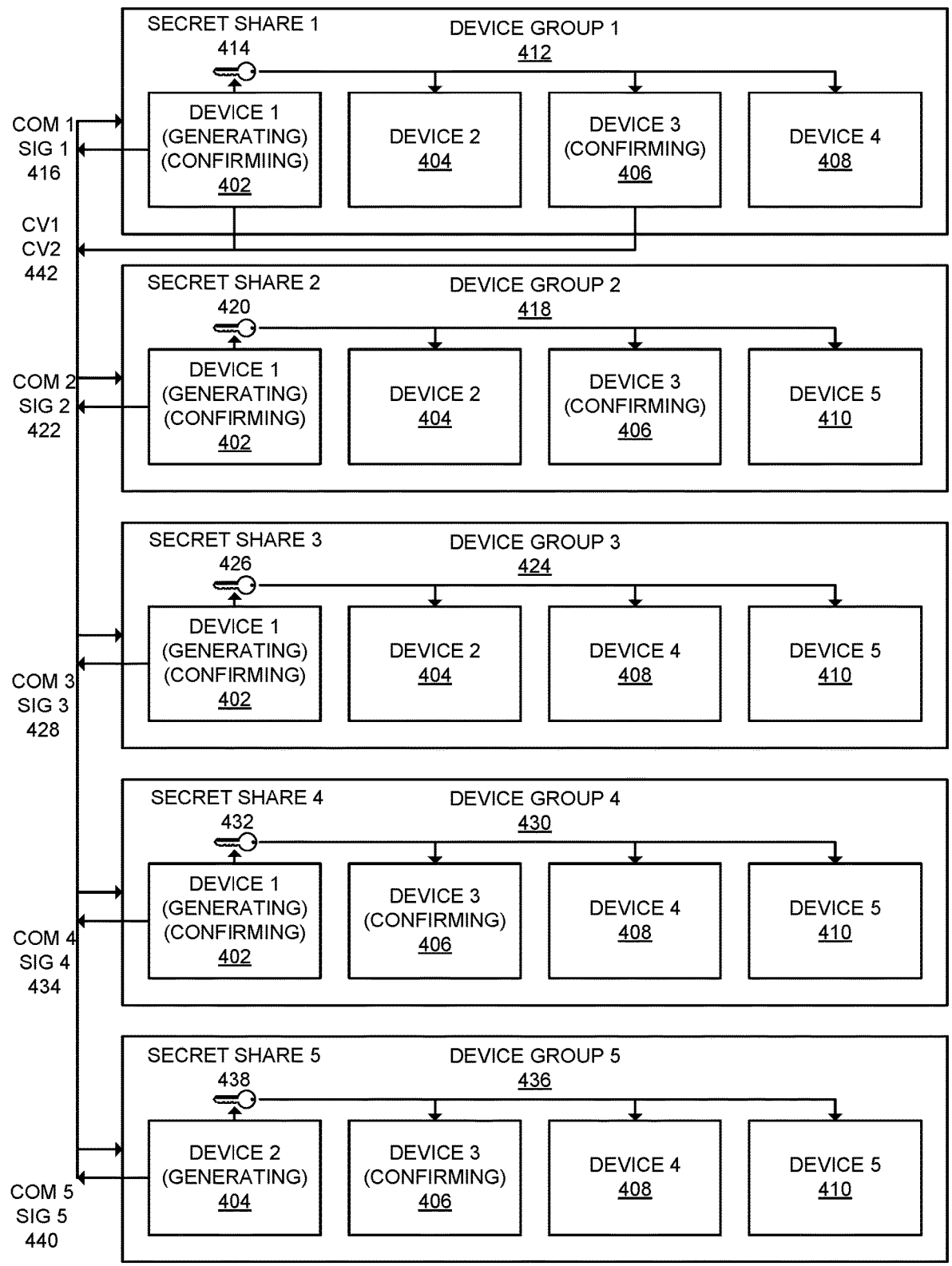
FIG. 4 shows a hybrid diagram detailing an exemplary process for generating and distributing secret shares according to some embodiments.
Figure 5:
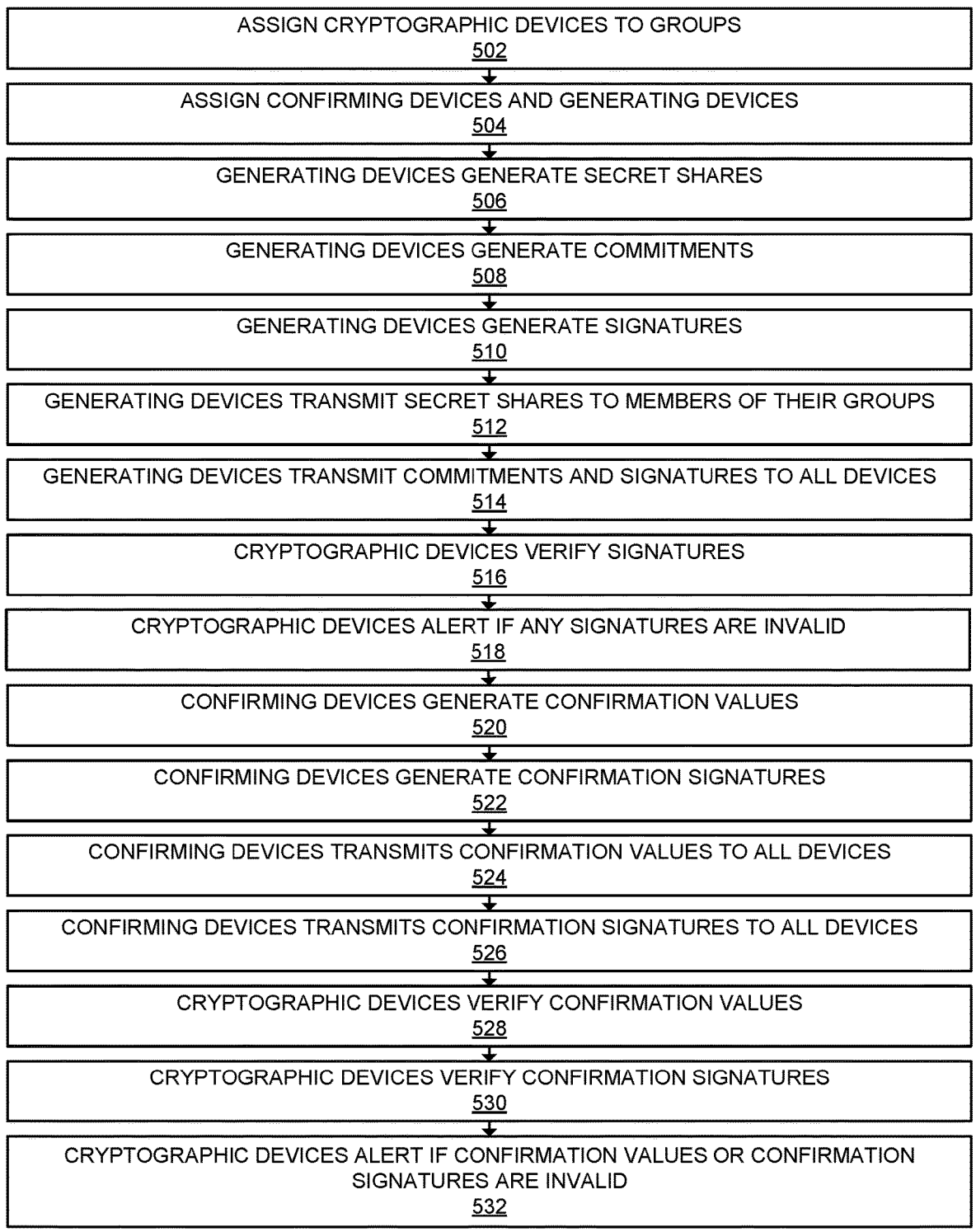
FIG. 5 shows a flowchart describing an exemplary process for generating and
distribution secret shares according to some embodiments.

Methods the can be used to generate and distribute secret shares may be better understood with reference to FIGS. 4 and 5. FIG. 4 shows cryptographic devices in cryptographic device groups, and additionally shows some steps associated with the generation and distribution of secret shares. FIG. 5 shows a flowchart that describes steps associated with the generation and distribution of secret shares in detail.

Referring to FIG. 4, five cryptographic devices (device 1 402, device 2 404, device 3 406, device 4 408, and device 5 410) are assigned to five cryptographic device groups (device group 1 412, device group 2 418, device group 3 424, device group 4 430, and device group 5 436). These cryptographic devices can alternatively be referred to as "a first device," "a second device," etc. Likewise, the cryptographic device groups can be referred to as "a first device group," "a second device group," etc.

It should be understood that labels such as "first," "second," etc., are intended only to differentiate between cryptographic devices, groups, etc., and are not intended to indicate importance or any other properties specific to the labelled devices. For example, one could swap a first device group and a second device group without any loss of generality. It should be understood that although the description below may refer to steps performed by a "first generating device," those steps could alternatively be performed by a "second generating device," a "third generating device," etc. Thus reference to specific devices or device groups is intended only for the purpose of example and is not intended to be limiting.

Each device group can comprise one generating device and one or more other cryptographic devices. Collectively, all cryptographic devices across all device groups may be referred to as a plurality of cryptographic devices.

In FIG. 4, device 1 402 can act as the generating device for device groups 1-4 (412, 418, 424, 430) and device 2 404 can act as the generating device for device group 5 436. Device 1 402 may be referred to as a "first generating device" and device 2 404 may be referred to as a "second generating device." Device 1 402 and device 2 404 may collectively be referred to as a "generating device group." Generating device groups, according to some embodiments, can comprise at least a threshold number of cryptographic devices t. This threshold number t may correspond to a number of cryptographic devices that can collectively perform distributed symmetric cryptography.

Device 1 402 may also act a confirming device. Likewise, device 3 406 may also act as a confirming device. Device 1 402 and device 3 406 may be collectively referred to as a "confirming device group." Confirming device groups, like generating device groups, can comprise at least a threshold number of cryptographic devices t.

As described below with reference to FIG. 5, the cryptographic devices can be assigned to their groups and be selected to act as generating devices and confirming devices based on any appropriate means. As an example, each cryptographic device could be associated with a numeric identifier, such as the identifiers 1-5 indicated in FIG. 4. Cryptographic devices can be assigned to device groups based on their respective numeric identifiers, and cryptographic devices can be selected to act as generating devices and confirming devices based on their respective numeric identifiers. For example, the cryptographic device in each group with the lowest numeric identifier can be selected to act as the generating device for that group. Device 1 402 has the lowest numeric identifier (1) in device groups 1 412, 2 418, 3 424, and 4 430, and can be selected to act as the generating device for those device groups. Device 2 404 has the lowest numeric identifier (2) in device group 436, and can be selected to act as the generating device for that device group.

The configuration of cryptographic devices shown in FIG. 4 can correspond to a "2-out-of-5" distributed symmetric cryptography system, where (after secret share distribution) any two cryptographic devices possess the full set of secret shares needed to perform distributed symmetric cryptography. It should be understood that although FIG. 4 shows a fairly specific configuration of device groups, generating devices, confirming devices, etc., embodiments of the present disclosure can be practiced with any appropriate configuration of cryptographic devices, generating devices, confirming devices, device groups etc. For example, for a "3-out-of-6" distributed symmetric cryptographic system, there could be 15 device groups, each comprising four cryptographic devices. Additionally there could three confirming devices, and three generating devices. Even for a "2-out-of-5" system as shown in FIG. 4, different cryptographic devices can be assigned to act as generating devices and confirming devices. For example, device 4 408 and device 5 410 could act as generating devices and device 2 404 and device 4 408 could act as confirming devices.

In general, the number of devices groups d can be proportional to a total number of cryptographic devices n and a threshold number of cryptographic devices t. The number of device groups d can be expressed as $$d = \binom{n}{n-t+1},$$

where n is a total number of cryptographic devices and/is a threshold number of cryptographic devices. Each device group can comprise a number of cryptographic devices proportional to a difference between the total number of cryptographic devices n and the threshold number of cryptographic devices t. Additionally, each device group can comprise a unique subset of n−t+1 cryptographic devices. The confirming device group can comprise a number of cryptographic devices that can be greater than or equal to the threshold number of cryptographic devices t. Likewise, the generating device group can comprise a number of generating devices that can be greater than or equal to the threshold number of cryptographic devices t.

It should be understood, as indicated in FIG. 4, that a cryptographic device can act in multiple roles (e.g., generating, non-generating (also referred to as receiving), confirming, etc.). For example, device 2 404 can be a generating device in device group 5 436, but can also be a non-generating member of device groups 1 412, 2 418, and 3 424. Device 1 402 can acts as a both a generating device and a confirming device, and device 3 406 can act as a confirming device but not a generating device. In FIG. 4, devices 4 408 and 5 410 can act as non-generating, non-confirming devices.

In general terms, each generating device can generate a secret share for their corresponding device group. In FIG. 4, device 1 can generate a secret share 414 for device group 1 412. Device 1 402 can generate a secret share 420 for device group 2 418. Device 1 402 can generate a secret share 426 for device group 3 424. Device 1 402 can generate a secret share 432 for device group 4 430. Device 2 404 can generate a secret share 438 for device group 5 436.

Each generating device can also generate commitments of their generated secret shares, using, for example, a hash function. Each generating device can generate a digital signature corresponding to these commitments by signing these commitments using a private (signing) key. As indicated in FIG. 4, device 1 402 can generate "COM 1" and "SIG 1" 416 corresponding to device group 1 412, "COM 2" and "SIG 2" 422 corresponding to device group 2 418, "COM 3" and "SIG 3" 428 corresponding to device group 3 424, and "COM 4" and "SIG 4" 434 corresponding to device group 4 430. Device 2 404 can generate "COM 5" and "SIG 5" 440 corresponding to device group 5 436.

The generating cryptographic devices can transmit the generated secret shares to their corresponding groups. For example, device 1 402 can transmit secret share 414 to device 2 404, device 3 406, and device 4 408. Device 2 404 can transmit secret share 438 to device 3 406, device 4 408, and device 5 410. Similar transmissions can be performed for other device groups.

The generating cryptographic devices can transmit the commitments and signatures to all cryptographic devices in all device groups. The cryptographic devices can use these commitments and digital signatures to verify that the generating devices are acting honestly. If a cryptographic device fails to verify a digital signature, it can transmit an alert message to the other cryptographic devices and abort the secret share distribution protocol.

The confirming devices (in FIG. 4, device 1 402 and device 3 406) can use these commitments to generate confirmation values (in FIG. 4 "CV1" and "CV2" 442), these confirmation values can be transmitted to all cryptographic devices in all device groups. Each cryptographic device can verify that the received confirmation values "CV1" and "CV2" 442 are equivalent. If so, the cryptographic devices can confirm that the secret share distribution process was performed correctly. Otherwise, if any cryptographic device determines that the confirmation values "CV1" and "CV2" 442 are not equivalent, that cryptographic device can transmit an alert message and abort the secret share distribution protocol.

This process for generating and distributing secret shares is explained with more detail below with reference to FIG. 5, which shows a flowchart corresponding to an exemplary method of secret share distribution according to some embodiments. Some steps in FIG. 5 may be optional.

A. Device Grouping and Generating Device Assignment

At step 502, the cryptographic devices can be assigned to their respective cryptographic device groups. As stated above, the number of device groups d may be proportional to the total number of cryptographic devices n and the threshold number of cryptographic devices t. In some embodiments, the number of devices groups d may be determined by the following formula:

$$d = \binom{n}{n-t+1}.$$

The number of cryptographic devices in each group may also be proportional to the total number of cryptographic devices n and the threshold number of cryptographic devices t. In some embodiments, the number of cryptographic devices in each device group may equal n−t+1. Each cryptographic device group can comprise a unique subset of n−t+1 cryptographic devices. The cryptographic devices may be assigned to each cryptographic device group using any appropriate means, provided that each group comprises a unique subset of n−t+1 cryptographic devices.

As an example, the cryptographic devices can be assigned to cryptographic device groups based on numeric identifiers and lexicographical ordering. For example, for a "2-out-of-5" threshold symmetric cryptography system (i.e., where/=2 and n=5), there may be 5 cryptographic device groups, each comprising 4 cryptographic devices. If each cryptographic device has a numeric identifier or index associated with it (e.g., 1, 2, 3, 4, 5), each device group could comprise cryptographic devices based on a lexicographic ordering of sets of numeric identifiers.

To illustrate, the lexicographic ordering of five sets each comprising four cryptographic devices is {1,2,3,4}, {1,2,3,5}, {1,2,4,5}, {1,3,4,5}, {2,3,4,5}. Thus the first device group could comprise cryptographic devices 1, 2, 3, and 4, the second group could comprise cryptographic devices 1, 2, 3, and 5, the third group could comprise cryptographic devices 1, 3, 4 and 5, etc.

Notably, the cryptographic devices do not necessarily need to be assigned to their respective cryptographic device groups during a secret share distribution operation. Each cryptographic device can be assigned to its respective group in advance. As an example, each cryptographic device can store a file or other data that identifies its respective cryptographic device groups ahead of time. For example, "cryptographic device 1" could possess a file that indicates that cryptographic device 1 is a member of cryptographic device groups 1, 2, 3, and 4. This file can be generated in advance by cryptographic device 1, another suitable computer entity, or an operator or administrator of the cryptographic device network.

At step 504, the generating devices for each group can be assigned. Additionally, confirming cryptographic devices can be assigned to the confirming device group. The generating devices can be assigned to their respective groups using any appropriate means, provided that for each cryptographic device group there is one generating device corresponding to that group. As an example, each cryptographic device may have a corresponding numeric identifier, and within each group, the generating device can be selected from among cryptographic device based on a numeric identifier associated with the generating device. For example, the cryptographic device with the lowest numeric identifier in a device group can be selected to act as the generating device for that device group. As another alternative, the cryptographic device with the highest numeric identifier can be selected to be the generating device. As with group assignment, generating device and confirming device selection can be performed in advance of a secret share generation and distribution operation. A cryptographic device can possess a file or other data that indicates whether the cryptographic device is a generating device for a particular group, whether the cryptographic device is a confirming device, etc.

Many other generating device selection alternatives exist. As an example, each cryptographic device can have a "threat score" or a "trustworthiness score," indicating how likely that cryptographic device is to be trustworthy. Within each group, the cryptographic device with the lowest threat score or the highest trustworthiness score can be selected to act as the generating device. As another alternative, the cryptographic devices in each group can "vote" for the generating device corresponding to that group. The cryptographic device with the most votes can act as the generating device.

Similar techniques can be used to select the confirming devices in the confirming device group. Notably, the confirming devices may not be associated directly with the cryptographic device groups. That is, unlike generating devices, each device group may not have a corresponding confirming device. Instead, a threshold number t cryptographic devices (or more) may be selected to act as confirming devices. These may comprise the t (or more) cryptographic devices with the lowest numeric index, lowest threat score, highest trustworthiness score, etc. Alternatively, the confirming devices may comprise t (or more) cryptographic devices selected via any other appropriate means. A cryptographic device can be selected to act as a confirming device in advance of performing a secret share generation and distribution operation. A cryptographic device can possess a file or other data element indicating whether that cryptographic device can act as a confirming device.

B. Data Generation and Distribution

Having been assigned to their respective cryptographic device groups and their respective roles (e.g., generating device, confirming device, non-generating (receiving) device, etc.), the generating devices can generate and distribute the secret shares. This process can generally comprise two phases. In a first phase, which can be referred to as a "data generation and distribution phase," the generating devices can generate the secret shares for their respective device groups and generate commitments and digital signatures corresponding to those secret shares. The generating devices can transmit the secret shares to the cryptographic devices in their respective cryptographic device groups, and transmit the commitments and digital signatures to all cryptographic devices.

At step 506, the generating devices can generate secret shares $sk_i$ for their respective groups. As an example, a first generating device can generate a first secret share $sk_1$ corresponding to a first device group. A second generating device could likewise generate a second secret share $sk_2$ corresponding to a second device group, and so on. The secret shares can be generated using any appropriate means. However, in order to reduce the likelihood that a malicious entity (e.g., a hacker) can determine the secret shares, it may be advantageous to generate the secret shares using a random number generator (or pseudorandom number generator). The secret shares can be randomly and uniformly selected from an interval, which may be defined by a security parameter $\kappa$ (e.g., 128). For example, a secret share may be uniformly randomly selected from an interval between 0 and $2^\kappa - 1$.

At step 508, the generating devices can each generate commitments corresponding to their respective secret shares. The generating devices can generate these commitments using a hash function $H_1$ (which may be referred to as a "first hash function"), or using any other appropriate means (e.g., group exponentiation). In this way a first generating device can generate a first commitment $H_1(s_1)$ using the first hash function and a first secret share $s_1$, and one or more other generating devices (e.g., a second generating device, a third generating device, etc.) can generate one or more other commitments using the first hash function and one or more other secret shares (e.g., $sk_2$, $sk_3$, etc.). Later in a "confirmation" phase, the cryptographic devices can use these commitments to verify digital signatures associated with the generating devices, in order to verify that the generating devices are acting honestly. Additionally, the confirming devices can use these commitments to generate confirmation values, which can be used to verify that the generating device transmitted the same commitments to all cryptographic devices.

At step 510, the generating devices can generate digital signatures by signing their respective commitments. The generating devices can sign these commitments using private (signing) keys corresponding to each generating device. These digital signatures can be verified using public (verification) keys corresponding to each private (signing) key. The public verification keys may be known by all cryptographic devices in the cryptographic device group. As an example, a first generating device can generate a first signature by digitally signing the first commitment using a first private key. Likewise, one or more other generating devices can generate one or more other digital signatures by digitally signing one or more other commitments using one or more other private keys.

At step 512, the generating devices can transmit the generated secret shares to members of their corresponding cryptographic device groups. For example, a first generating device can transmit a first secret share $sk_1$ to one or more other cryptographic devices in the first device group. The generating devices can transmit the generated secret shares via any appropriate means, such as, e.g., secure and authenticated point-to-point communication channels.

Because cryptographic devices may belong to multiple distinct cryptographic device groups, a cryptographic device may receive generated secret shares from multiple generating devices. Additionally, a generating device for one cryptographic device group may be a non-generating device for another cryptographic device group device. Thus a generating device for one device group may receive a generated secret share from another generating device. As an example, a first generating device (belonging to a first device group and a second device group) can receive a second secret share from a second generating device of the second device group.

At step 514, the generating devices can transmit their commitments and digital signatures to each other cryptographic device. This can include other generating devices, non-generating devices, confirming devices, etc. As an example, a first generating device can receive one or more other commitments and one or more other digital signatures from one or more other generating devices. Likewise, a non-generating device or a confirming device can receive a first commitment and a first digital signature from a first generating device, and one or more other commitments and one or more other signatures from one or more other generating devices. The generating devices can transmit these commitments and secret shares via any appropriate means, such as, e.g., secure and authenticated point-to-point communication channels. These commitments and signatures may be used during a confirmation phase, in order to verify that the generating devices acted honestly during secret share generation.

C. Confirmation

During a second phase, also referred to as a "confirmation phase," the cryptographic devices including the confirming devices can perform a series of steps to verify that the secret shares were generated and distributed honestly. These steps can include verifying the digital signatures, generating confirmation values, and confirming that the confirmation values are equivalent.

At step 516, the cryptographic devices can verify the digital signatures corresponding to the commitments received from the generating devices at step 514. For each signature received from the generating devices, a cryptographic device can verify that digital signature using the corresponding commitment and a public key corresponding to the private key used to generate the signature. As an example, in order to verify a digital signature, each cryptographic device can decrypt the digital signature using a public key (or public keys) corresponding to a private key used to generate the signature. For example, a cryptographic device can verify the first digital signature by decrypting the first digital signature using a first public key corresponding to the first private key used by a first cryptographic device to generate the first digital signature. If a decrypted digital signature matches its corresponding commitment, the digital signature has been successfully verified.

At optional step 518, any cryptographic device can generate an alert message if any of the digital signatures fail to verify. If, for example, the digital signatures received from the generating devices include one or more invalid digital signatures, and these invalid digital signatures fail to verify, a cryptographic device can identify one or more (generating) cryptographic devices corresponding to the one or more invalid digital signatures. These cryptographic devices can be identified using any suitable means, such as a numeric device identifier, serial number, IP address, etc. The alert message can include this identification. The cryptographic device can transmit the alert message to the one or more other cryptographic devices in the cryptographic device network. In this way, the cryptographic devices in the cryptographic device network can identify any malicious or dishonest cryptographic devices. Additionally, after transmitting the alert message, the cryptographic device can abort the secret share generation and distribution protocol.

At step 520, a plurality of confirming devices can generate a plurality of confirmation values ar. In some embodiments, the plurality of confirmation values can be generated using the commitments received from the generating devices and a second hash function. In some embodiments, this second hash function may be the same as the first hash function used to generate the commitments. As an example, each confirming device can generate its corresponding confirmation value by concatenating the commitments $c_i$ received from the generating devices, thereby generating a concatenated value (i.e., $c_i \| \ldots \| c_d$), then hashing the concatenated value using the second hash function, thereby generating a confirmation value (i.e., $a_i = H_2(c_i \| \ldots \| c_d)$). This second hash function may be the same as the first hash function used to generate the commitments at step 508. In some cases, the term "additional confirmation value" may be used to distinguish a confirmation value generated by a particular confirming device (e.g., a "first cryptographic device") from "one or more other confirmation values" generated by one or more other confirming device (e.g., all other confirming devices in the confirming device group, excluding the particular cryptographic device).

At step 522, the confirming devices can generate confirmation signatures by digitally signing the confirmation values. Each confirming device can digitally sign its corresponding confirmation value using a private (signing) key corresponding to that device. For example, a first cryptographic device (acting as a confirming device) can generate a first confirming signature by digitally signing a first confirmation value using a first private key.

At step 524, the confirming devices can transmit their confirmation values to each other cryptographic device. This can include other generating devices, non-generating devices, confirming devices, etc. In this way, each cryptographic device can receive a plurality of confirmation values from the confirmation device group. The confirmation values and confirmation signatures can be transmitted via any appropriate means, e.g., secure and authenticated point-to-point channels.

At step 526, the confirming devices can transmit the confirmation signatures to all cryptographic devices. This can include other generating devices, non-generating devices, confirming devices, etc. In this way, each cryptographic device can receive a plurality of confirmation signatures from the confirmation device group. The confirmation signatures can be transmitted via any appropriate means, e.g., secure and authenticated point-to-point channels. Steps 524 and 526 can optionally be combined into a single step.

At step 528, each cryptographic devices can verify the received confirmation values. This can accomplish comparing the received confirmation values to verify that they are equivalent. If the confirmation values are equivalent, it may indicate that the generating devices transmitted the same set of commitments to each cryptographic device in the cryptographic device network. If the confirmation values are not equivalent, it may indicate that one or more generating devices did not transmit the same set of commitments to each cryptographic device in the cryptographic device network, and consequently that one or more generating devices are acting dishonestly or maliciously.

At step 530, the cryptographic devices can verify the confirmation signatures corresponding to the confirmation values received from the confirming devices at step 524. For each signature received from the confirming devices, a cryptographic device can verify that digital signature using the corresponding confirmation value and a public key corresponding to the private key used to generate the confirmation signature. As an example, in order to verify a confirmation signature, each cryptographic device can decrypt the confirmation signature using a public key corresponding to a private key used to generate the signature. For example, a cryptographic device can verify a first digital confirmation signature by decrypting the first confirmation signature using a first public key corresponding to the first private key used by a first cryptographic device to generate the first confirmation signature. If a decrypted confirmation signature matches its corresponding confirmation value, the confirmation signature has been successfully verified.

At optional step 532, any cryptographic device can generate an alert message if any of the confirmation values or confirmation signatures fail to verify. If, for example, one or more confirmation values are not equivalent to the other confirmation values, or one or more confirmation signatures are invalid, a cryptographic device can identify one or more cryptographic devices corresponding to the one or more confirmation values and/or one or more invalid confirmation signatures. These cryptographic devices can be identified using any suitable means, such as a numeric device identifier, serial number, IP address, etc. The alert message can include this identification. The cryptographic device can transmit the alert message to the one or more other cryptographic devices in the cryptographic device network. In this way, the cryptographic devices in the cryptographic device network can identify any malicious or dishonest cryptographic devices. Additionally, after transmitting the alert message, the cryptographic device can abort the secret share generation and distribution protocol.

V. Distributed Symmetric Cryptography

Once the secret shares have been distributed to the cryptographic devices, the cryptographic devices can use the secret shares to perform distributed symmetric cryptographic operations, including encryption and decryption. A cryptographic device (e.g., a first cryptographic device, a first generating device, etc.), can perform a distributed cryptographic operation with one or more other participating cryptographic devices, comprising cryptographic devices from a plurality of cryptographic devices (e.g., a cryptographic device network). The cryptographic device and the one or more other participating cryptographic devices can comprise a threshold number/of cryptographic devices. These distributed cryptographic operations can be performed on a data element, which can comprise a message (to be encrypted) or a ciphertext (to be decrypted). The cryptographic devices can perform the distributed cryptographic operation using their respective secret shares. For example, a first cryptographic device, possessing a first secret share and a second secret share can perform the distributed cryptographic operation using at least the first secret share and the second share. Each other participating cryptographic devices can perform the distributed cryptographic operation using one or more unique key shares. That is, if two cryptographic devices possess the same secret share (e.g., because they both belong to a particular cryptographic device group), only one cryptographic device can use that secret share during the distributed cryptographic operation. The other cryptographic device can use a different secret share.

Figure 6:
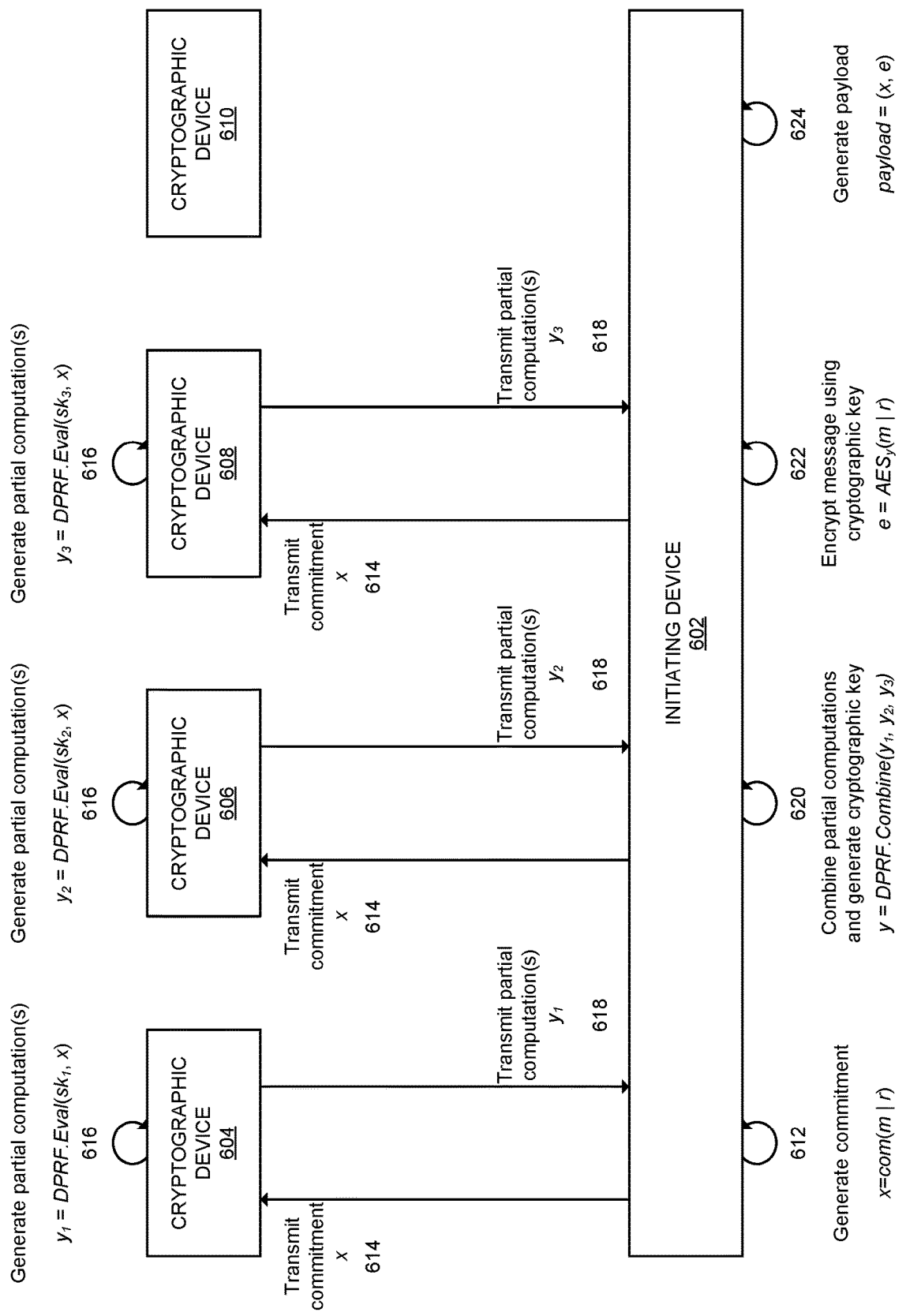
FIG. 6 shows a hybrid sequence diagram corresponding to an exemplary method of distributed symmetric encryption.
Figure 7:
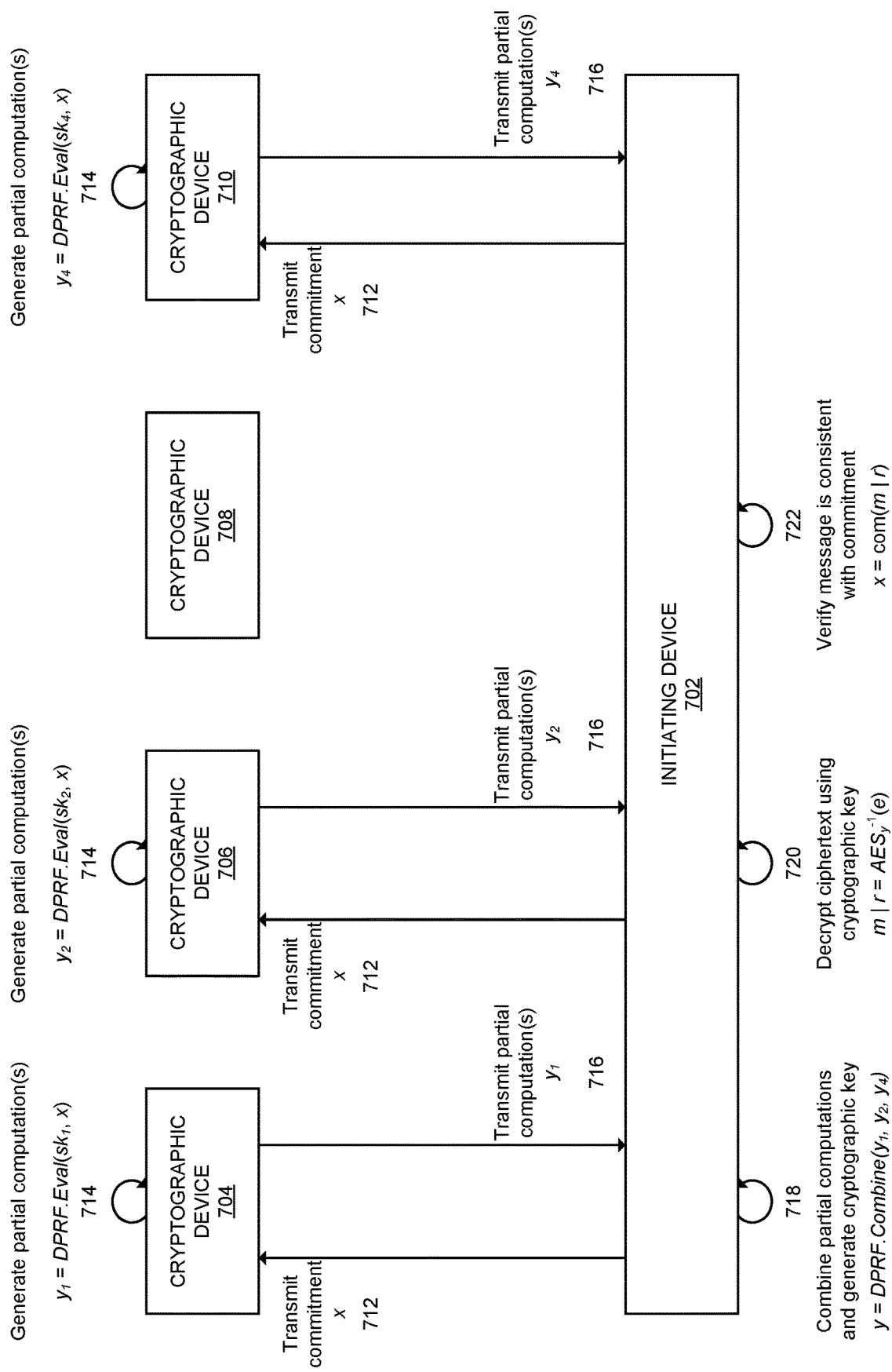
FIG. 7 shows a hybrid sequence diagram corresponding to an exemplary method of distributed symmetric decryption.

This Section generally describes a distributed symmetric encryption process and a distributed symmetric decryption process with reference to FIGS. 6 and 7 in order to provide a broader context for the methods and systems used to distribute secret shares described above. The description is intended to be illustrative and not limiting. There are many ways in which distributed symmetric cryptography may be performed. More details on potential implementations of distributed symmetric cryptography can be found in U.S. Publication No. 2021/0243020, U.S. patent application Ser. No. 16/861,138, and U.S. Patent Application No. PCT/US2021/029429, which are incorporated by reference in their entirety for all purposes.

A. Distributed Symmetric Encryption

FIG. 6 shows a hybrid sequence diagram of an exemplary distributed symmetric encryption process performed by an initiating device 602 and a plurality of cryptographic devices 604-610. Distributed symmetric encryption may be performed if the aforementioned data element comprises a message to be encrypted.

A threshold number of cryptographic devices may participate in the distributed symmetric encryption process. This threshold number of cryptographic devices may collectively possess a total number of secret shares that can be used for distributed symmetric encryption. In FIG. 6, three cryptographic devices (cryptographic devices 604-608) are shown participating in the encryption process, while a fourth cryptographic device (cryptographic device 610) is not participating. This illustration is intended only as a non-limiting example. Threshold distributed symmetric cryptography can be performed with any total and threshold number of cryptographic devices.

The initiating device 602 may comprise any device or computer system that initiates the distributed symmetric encryption process. As an example, the initiating device 602 may comprise a client computer that possesses a message m that the client computer (or its operator) wants to encrypt. A network of cryptographic devices (i.e., cryptographic devices 604-610) may perform distributed symmetric cryptography as a service to the client computer. Alternatively, the initiating device 602 may comprise a cryptographic device that possesses a message m and initiates an encryption operation with cryptographic devices 604-610.

At step 612, the initiating device 602 can generate a commitment x. The commitment may be generated based on a message m and a random value r (alternatively referred to as a "random nonce"). The commitment x may comprise a hash value generated using the message m and the random value r as an input to a hash function (e.g., SHA-256).

At step 614, the initiating device 602 may transmit a request including the commitment x (sometimes referred to as a message commitment) to a plurality of participating cryptographic devices, i.e., cryptographic devices 604-608. The initiating device 602 may transmit the commitment x to the participating cryptographic devices 604-608 either directly or via a proxy device.

At step 616, the cryptographic devices 604-608 may generate partial computations $y_1$ $y_2$, and $y_3$ based on the message commitment x and their respective secret shares $sk_1$, $sk_2$, and $sk_3$. The cryptographic devices 604-608 may generate these partial computations $y_1$, $y_2$, and $y_3$ using a distributed pseudorandom function, as described above in Section II. The cryptographic devices 504-508 may generate the partial computation $y_1$, $y_2$, and $y_3$ by calling a distributed pseudorandom evaluation function DPRF.Eval, using the commitment x and the respective secret shares $sk_1$, $sk_2$, and $sk_3$ (i.e., $y_i$=DPRF.Eval ($sk_i$, x)). The distributed pseudorandom function may comprise an elliptic curve cryptographic function. For example, cryptographic devices 504-508 may generate their corresponding partial computation $y_i$ by encrypting the commitment x using elliptic curve cryptography and their respective secret share $sk_i$ as the cryptographic key.

In some embodiments, each cryptographic device can possess multiple secret shares corresponding to different device groups. In these embodiments, each cryptographic device can use multiple secret shares to generate their respective partial computation. Alternatively, each cryptographic device can generate multiple partial computations, where each partial computation can correspond to one of their respective secret shares.

At step 618, the participating cryptographic devices 604-608 may transmit the partial computations $y_1$, $y_2$, and $y_3$ to initiating device 602. The participating cryptographic devices 604-608 may transmit the partial computations $y_1$, $y_2$, and $y_3$ either directly or via a proxy device.

Optionally at step 618, the participating cryptographic devices 604-608 may each transmit a non-interactive zero-knowledge proof (NIZK) to the initiating device 602. The initiating device 602 may use the NIZKs to verify that the partial computations $y_1$, $y_2$, and $y_3$ corresponding to those NIZKs were generated correctly. If any NIZKs fail to verify, the initiating device 602 can abort the distributed symmetric encryption process.

At step 620, initiating device 602 may combine the partial computations and generate a session key. "The partial computations" may also be referred to as "one or more partial computations" (e.g., generated by a first cryptographic device, such participating cryptographic device 604) and "one or more additional partial computations" (e.g., generated by all other participating cryptographic devices 606-608). Initiating device 602 may combine the partial computations $y_1$, $y_2$, and $y_3$ to generate a key generation seed, and the key generation seed may be used along with a key generation algorithm to generate the session key. The initiating device 602 may combine the partial computations using any appropriate means. For example, the initiating device 602 can use a distributed pseudorandom combination function DPRF.Combine using the partial computations $y_1$, $y_2$, and $y_3$ as arguments (i.e., y=DPRF.Combine($y_1$, $y_2$, $y_3$)). This function may involve initiating device 602 determining a plurality of Lagrange coefficients corresponding to the plurality of partial computations. The initiating device 602 may generate a plurality of intermediate computations by exponentiating each partial computation with its corresponding Lagrange coefficient. The initiating device 602 can then generate a key generation seed by calculating the product of the plurality of intermediate computations. The key generation seed may be input into a key generation algorithm to produce the session key. See Section II above for more detail.

At step 622, the initiating device 602 can encrypt the message m using the session key, thereby generating a ciphertext e. Alternatively, initiating device 602 can encrypt the message m and the random number r used to blind the commitment (see step 612). The initiating device 602 can encrypt the message using any appropriate symmetric cryptosystem corresponding to the cryptographic key, such as AES (e.g., as shown at step 622, where the ciphertext e=$AES_y$(m|r)).

At step 624, the initiating device 602 can generate a payload comprising the ciphertext e and the message commitment x. This payload comprises information that can be used to decrypt the ciphertext using distributed symmetric cryptography. The initiating device 602 can transmit this payload to a client computer in order to securely transmit the message m. Alternatively the initiating device 602 can store the payload in a database and retrieve the payload at a later time (e.g., when the initiating device 602 intends to decrypt the payload.

It should be understood that FIG. 6 is intended only to illustrate one implementation of a distributed symmetric encryption scheme. The purpose of FIG. 6 is largely to provide context for some embodiments, particularly methods and systems used to distribute secret shares. As such, FIG. 6 omits several steps or operations that may be advantageous in some implementations of distributed symmetric cryptography. It should be understood that embodiments of the present disclosure can be used in conjunction with these omitted operations, and are not solely limited to the generic implementation shown in FIG. 6. As an example, and as described in more detail in U.S. Publication No. 2021/0243020, the cryptographic devices could each generate and transmit a partial signature to the initiating device 602. The initiating device 602 can combine these partial signatures to generate a verification signature that can later be used in a distributed symmetric decryption operation. Additionally, the participating cryptographic devices 604-608 can each record, in a log file, the encryption operation performed by the initiating device 602 and the participating cryptographic devices 604-608.

As another example, as described in more detail in U.S. patent application Ser. No. 16/861,138, the initiating device 602 can generate and transmit two commitments instead of a single commitment to the cryptographic devices. Each participating cryptographic device 604-608 can generate two partial computations based on the commitments (e.g., at step 616), then combine these two partial computations to produce a single partial computation, which can then be transmitted back to the initiating device 602 at step 618. The use of multiple secret shares may make the distributed cryptographic system resistant to adaptive cryptographic attack, as the partial computations used to generate the cryptographic key (i.e., at step 620) are not bound to a single secret value or single set of secret shares.

As yet another example, as described in more detail in U.S. Patent Application No. PCT/US2021/029429, the initiating device 602 can possess multiple messages $m_1, \ldots, m_n$ that it intends to encrypt. Rather than generate a commitment x of a single message, The initiating device 602 can instead generate a commitment of an identifier id corresponding to the initiating device 602. The resulting partial computations $y_1$, $y_2$, $y_3$ (i.e., those received by the initiating device 602 at step 618), can be combined by the initiating device 602 to generate a bulk key bk. For each message $m_1, \ldots, m_n$ that the initiating device 602 intends to encrypt, the initiating device 602 can derive a message key using a bilinear pairing between the bulk key and a commitment corresponding to the message. The initiating device 602 can then encrypt each message with its corresponding message key. This method may be faster than, e.g., performing multiple rounds of communication with the cryptographic devices to generate partial computations corresponding to each message key. Likewise, this method may be more secure than reusing a single cryptographic key on multiple distinct messages.

B. Distributed Symmetric Decryption

FIG. 7 shows a hybrid sequence diagram of an exemplary distributed symmetric decryption process, performed by an initiating device 702 and a plurality of cryptographic devices 704-710. Distributed symmetric decryption may be performed if the aforementioned data element comprises a ciphertext to be decrypted.

A threshold number of cryptographic devices may participate in the distributed symmetric decryption process. This threshold number of cryptographic devices can collectively possess a total number of secret shares that can be used for distributed symmetric decryption. In FIG. 7, three cryptographic devices (cryptographic devices 704, 706, 710) are shown participating in the decryption process, while a fourth cryptographic device (cryptographic device 708) is not participating. Notably, the initiating device 702 can perform distributed symmetric decryption with cryptographic devices other than the cryptographic devices used during distributed symmetric encryption (e.g., cryptographic devices 604-608 from FIG. 6). The process illustrated by FIG. 7 is intended only as a non-limiting example. Threshold distributed symmetric cryptography can be performed with any total and threshold number of cryptographic devices.

At step 712 the initiating device 702 can transmit the message commitment x to the cryptographic devices 704, 706, and 710. The initiating device 702 may have generated this commitment itself, or may have received the commitment from another computer, such as a client computer. For example, a client computer may have performed a distributed symmetric encryption process and generated a payload comprising a ciphertext e and a commitment x. The client computer may have transmitted this payload to initiating device 702, and initiating device 702 may transmit the commitment received in the payload to cryptographic devices 704, 706, and 710. The initiating device 702 may transmit the commitment to cryptographic devices 704, 706, and 710 either directly or via a proxy device. Regardless of its source, the message commitment may be generated using a message and a hash function.

At step 714, cryptographic devices 704, 706, and 710 can generate partial computations $y_1$, $y_2$, and $y_4$ based on the message commitment x and their respective secret shares $sk_1$, $sk_2$, and $sk_4$. The cryptographic devices 704, 706, and 710 may generate these partial computations using a distributed pseudorandom function, as described above in Section II. For example, as shown in FIG. 7, cryptographic devices 704, 706, and 710 may execute a DPRF.Eval function using their respective secret shares and the commitment as arguments. The distributed pseudorandom function may comprise an elliptic curve cryptographic function. For example, cryptographic devices 704, 706, and 710 may each generate a partial computation by encrypting the commitment using elliptic curve cryptography by using their respective secret share as a cryptographic key.

In some embodiments, each cryptographic device can possess multiple secret shares corresponding to different device groups. In these embodiments, each cryptographic device can use multiple secret shares to generate their respective partial computation. Alternatively, each cryptographic device can generate multiple partial computations, where each partial computation can correspond to one of their respective secret shares.

At step 716, the participating cryptographic devices 704, 706, and 710 may transmit the partial computations $y_1$, $y_2$, and $y_4$ to initiating device 702. The participating cryptographic devices 704, 706, and 710 may transmit the partial computations either directly or via a proxy device.

Optionally at step 716, the participating cryptographic devices 704, 706, and 710 may each transmit a non-interactive zero knowledge proof (NIZK) to the initiating device 702. The initiating device 702 may use the NIZKs to verify that the partial computations corresponding to those NIZKs were generated correctly. If any NIZKs fail to verify, the initiating device 602 can abort the distributed symmetric decryption process.

At step 718, initiating device 702 may combine the partial computations and generate a session key. "The partial computations" may also be referred to as "one or more partial computations" (e.g., generated by a first cryptographic device, such participating cryptographic device 704) and "one or more additional partial computations" (e.g., generated by all other participating cryptographic devices, such as participating cryptographic devices 706 and 710). Initiating device 702 may combine the partial computations to generate a key generation seed, then use the key generation seed as an input to a key generation algorithm in order to generate the session key. The initiating device 702 may combine the partial computations using any appropriate means, such as a DPRF.Combine function that uses the partial computations $y_1$, $y_2$, and $y_4$ as arguments. For example, initiating device 702 may first determine a plurality of Lagrange coefficients corresponding to the plurality of partial computations. Initiating device 702 can generate a plurality of intermediate computations by exponentiating each partial computation with its corresponding Lagrange coefficient. Initiating device 702 can then generate a key generation seed by calculating the product of the plurality of intermediate computations. Initiating device 702 can then input the key generation seed into a key generation algorithm to produce the cryptographic key. See Section II above for more detail.

At step 720, initiating device 702 can decrypt the ciphertext using the session key to generate the message m. Alternatively, initiating device 702 can decrypt the ciphertext to produce the message m and a random value r used to blind the commitment (see step 612 of FIG. 6). The initiating device 702 can decrypt the ciphertext using any appropriate symmetric cryptosystem corresponding to the cryptographic key, such as AES (e.g., as shown in FIG. 7, m|r=$AES_y^{-1}$(e)).

At optional step 722, the initiating device 702 can verify the message m is consistent with the message commitment x. The initiating device 702 can use the message and the random value as an input to a hash function to generate an additional commitment. The initiating device 702 can then compare the commitment transmitted in step 712 to the commitment generated at step 722. If the commitments are identical, it indicates that the message was encrypted and decrypted correctly.

It should be understood that FIG. 7 is intended only to illustrate one implementation of a distributed symmetric decryption scheme. The purpose of FIG. 7 is largely to provide context for some embodiments. As such, FIG. 7 omits several steps or operations that may be advantageous in some implementations of distributed symmetric cryptography. It should be understood that embodiments of the present disclosure can be used in conjunction with these omitted operations, and are not solely limited to the generic implementation shown in FIG. 7. As an example, and as described in more detail in U.S. Publication No. US-2021-0243020-A1, the distributed cryptographic scheme could involve the use of verification signatures and cryptographic logging in order to provide for "ciphertext accountability,"

i.e., the ability to verify the cryptographic actions (such as encryption or decryption) performed by the initiating device 702. In addition to the commitment x, at step 712 the initiating device can transmit a verification signature to the cryptographic devices 704, 706, and 710. Each cryptographic device 704, 706, and 710 can then verify the verification signature using a verification key vk corresponding to the verification signature. If the verification signature fails to verify, any cryptographic device 704, 706, or 710 can abort the distributed symmetric decryption operation. Additionally, each cryptographic device 704, 706, and 710 can record the initiating device's 702 intent to decrypt ciphertext in a log file, allowing for ciphertext accountability. Afterwards, each cryptographic device 704, 706, and 710 can generate their respective partial computation and transmit it to the initiating device 702 (e.g., at step 716). The initiating device 702 can then combine the partial computations to produce a cryptographic key, then decrypt the ciphertext using the cryptographic key to produce the message.

As another example, as described in more detail in U.S. patent application Ser. No. 16/861,138, the distributed cryptography scheme may involve the use of two commitments (and optionally a verification signature). By using two commitments, the distributed cryptography scheme is more resistant to adaptive cryptographic attacks. Rather than transmitting the commitment x to participating cryptographic devices 704, 706, and 710 at step 712, the initiating device 702 can instead transmit two commitments and a verification signature to the cryptographic devices 704, 706, and 710. The cryptographic devices 704, 706, and 710 can each use the two commitments to generate two partial computations, then combine the two partial computations into a single partial computation. Each cryptographic device 704, 706, and 710 can transmit their single partial computation back to the initiating device 702, which can subsequently combine the partial computations to produce a cryptographic key, then use the cryptographic key to decrypt a ciphertext and produce the message.

As yet another example, as described in more detail in U.S. Patent Application No. PCT/US2021/029429, the distributed symmetric cryptography scheme may involve the generation and use of bulk keys and message keys. A bulk key may be generated for a set of messages, and from the bulk key, message keys may be generated in order to encrypt individual messages. As such, when decrypting a message, instead of transmitting the commitment x to the cryptographic devices at step 712, the initiating device 702 can transmit an input value, either comprising a nonce $\mu$, or an identifier id and a hash value $\alpha$. If necessary, the participating cryptographic devices 704, 706 and 710 can use the identifier id and hash value $\alpha$ to generate the nonce $\mu$ using two hash functions and a bilinear pairing. Each participating cryptographic device can then calculate a partial computation based on their respective secret share and the nonce $\mu$, then transmit those partial computations to the initiating device 702. The initiating device 702 can then combine the partial computations to produce a message key in order to decrypt the message.

VI. Computer System

Figure 8:
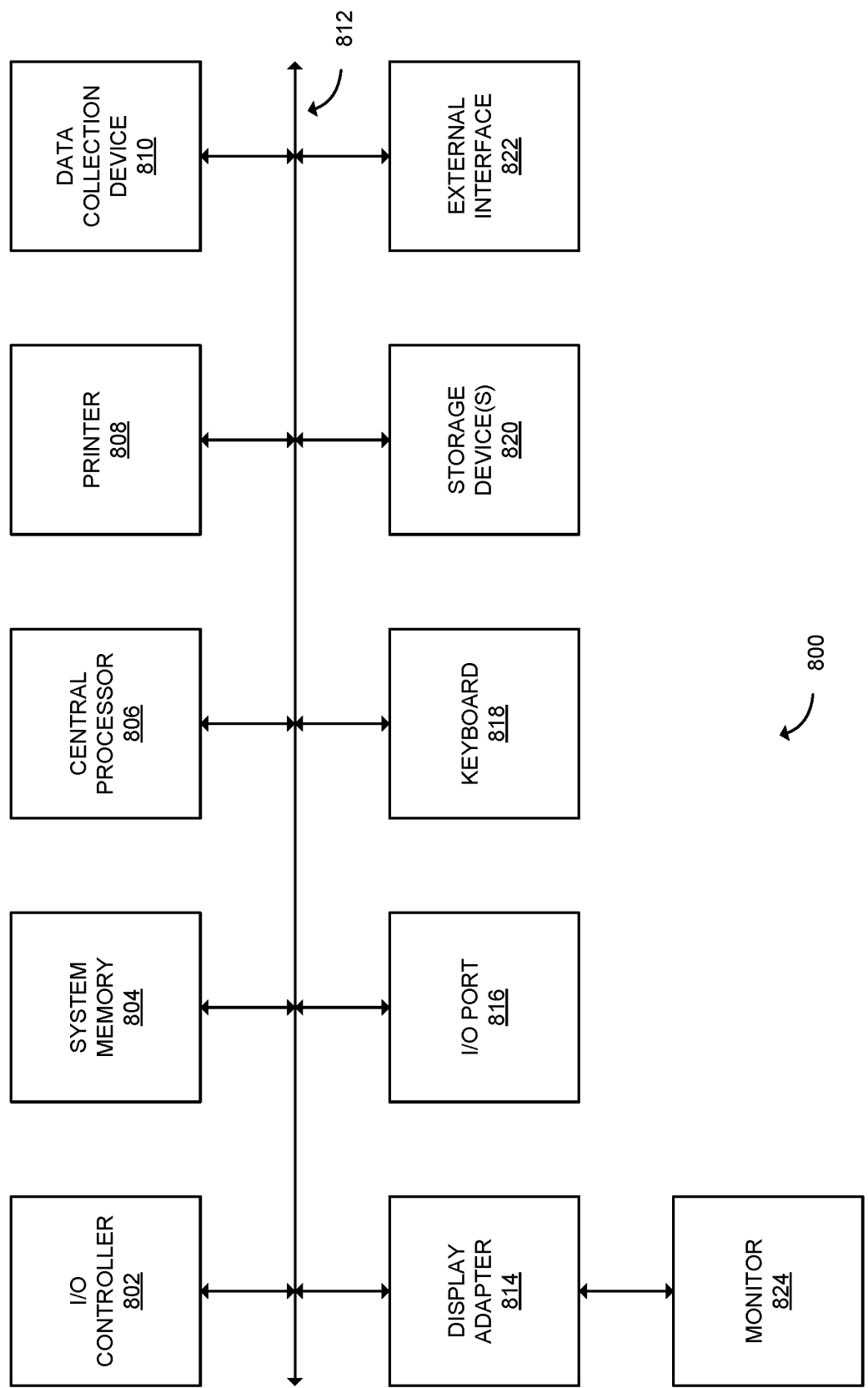
FIG. 8 shows an exemplary computer system according to some embodiments.

Any of the computer systems mentioned herein may utilize any suitable number of subsystems. Examples of such subsystems are shown in FIG. 8 in computer system 800. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 8 are interconnected via a system bus 812. Additional subsystems such as a printer 808, keyboard 818, storage device(s) 820, monitor 824 (e.g., a display screen, such as an LED), which is coupled to display adapter 814, and others are shown. Peripherals and input/output (I/O) devices, which couple to I/O controller 802, can be connected to the computer system by any number of means known in the art such as input/output (I/O) port 816 (e.g., USB, FireWire®). For example, I/O port 816 or external interface 822 (e.g. Ethernet, Wi-Fi, etc.) can be used to connect computer system 800 to a wide area network such as the Internet, a mouse input device, or a scanner. The interconnection via system bus 812 allows the central processor 806 to communicate with each subsystem and to control the execution of a plurality of instructions from system memory 804 or the storage device(s) 820 (e.g., a fixed disk, such as a hard drive, or optical disk), as well as the exchange of information between subsystems. The system memory 804 and/or the storage device(s) 820 may embody a computer readable medium. Another subsystem is a data collection device 810, such as a camera, microphone, accelerometer, and the like. Any of the data mentioned herein can be output from one component to another component and can be output to the user.

A computer system can include a plurality of the same components or subsystems, e.g., connected together by external interface 822, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising performing, by a first generating device of a plurality of cryptographic devices:
    generating a first secret share corresponding to a first device group, the first device group comprising the first generating device and one or more other cryptographic devices of the plurality of cryptographic devices;
    generating a first commitment by hashing the first secret share using a first hash function;
    generating a first signature by digitally signing the first commitment using a first private key;
    transmitting the first secret share to the one or more other cryptographic devices in the first device group;
    transmitting the first commitment and the first signature to a plurality of other cryptographic devices, wherein the plurality of other cryptographic devices verify that the first signature is valid;
    receiving one or more confirmation values from a confirming device group, the confirming device group comprising a threshold number of cryptographic devices of the plurality of cryptographic devices, wherein the one or more confirmation values are generated using a second hash function, the first commitment, and one or more other commitments generated by one or more other generating devices; and
    verifying that the one or more confirmation values are equivalent to each other.

2. The method of claim 1, wherein the plurality of cryptographic devices comprises the first generating device and the plurality of other cryptographic devices.

3. The method of claim 1, wherein the plurality of other cryptographic devices receive the one or more confirmation values from the confirming device group, and wherein the plurality of other cryptographic devices verify that the one or more confirmation values are equivalent.

4. The method of claim 1, further comprising:
    receiving the one or more other commitments and one or more other signatures from the one or more other generating devices; and
    for each signature of the one or more other signatures, verifying the signature using a corresponding commitment and a public key corresponding to a private key used to generate the signature.

5. The method of claim 1, wherein the first secret share is generated using a random number generator or pseudorandom number generator.

6. The method of claim 1, wherein the first hash function and the second hash function are equivalent.

7. The method of claim 1, wherein a plurality of device groups includes the first device group, and wherein the plurality of device groups comprises a number of device groups proportional to a total number of cryptographic devices and the threshold number of cryptographic devices.

8. The method of claim 1, wherein a number of cryptographic devices in the first device group is proportional to a difference between a total number of cryptographic devices and the threshold number of cryptographic devices.

9. The method of claim 1, wherein the first generating device is selected from among the plurality of cryptographic devices in the first device group based on a first numeric identifier associated with the first generating device.

10. The method of claim 1, wherein the first generating device is a member of the confirming device group, and wherein the method further comprises:
receiving the one or more other commitments from the one or more other generating devices;
generating an additional confirmation value using the first commitment, the one or more other commitments, and the second hash function; and
transmitting the additional confirmation value to the plurality of other cryptographic devices, wherein the plurality of other cryptographic devices verify that the additional confirmation value and the one or more confirmation values received from the one or more confirming devices are equivalent.

11. The method of claim 10, further comprising:
generating a first confirmation signature by digitally signing the additional confirmation value using the first private key; and
transmitting the first confirmation signature to the plurality of other cryptographic devices, wherein the plurality of other cryptographic devices verify the first confirmation signature using a first public key corresponding to the first private key.

12. The method of claim 1, wherein the first generating device is a non-generating member of a second device group, wherein the method further comprises receiving a second secret share from a second generating device of the second device group.

13. The method of claim 12, further comprising:
performing a distributed cryptographic operation with one or more other participating cryptographic devices, the one or more other participating cryptographic devices being of the plurality of cryptographic devices, wherein the first generating device and the one or more other participating cryptographic devices comprise the threshold number of cryptographic devices, wherein the distributed cryptographic operation is performed on a data element, wherein the first generating device performs the distributed cryptographic operation using at least the first secret share and the second secret share, and wherein the one or more other participating cryptographic devices each perform the distributed cryptographic operation using one or more unique key shares.

14. The method of claim 13, wherein the data element comprises a message, and wherein performing the distributed cryptographic operation with one or more other participating devices comprises:
receiving, from an initiating device, a request including a message commitment generated using the message and a hash function;
generating one or more partial computations based on the message commitment and at least the first secret share and the second secret share, wherein the one or more other participating cryptographic devices generate one or more other partial computations using the one or more unique key shares; and
transmitting the one or more partial computations to the initiating device, thereby enabling the initiating device to: (1) generate a session key using the one or more partial computations and one or more additional partial computations, (2) encrypt the message using the session key, thereby generating a ciphertext, and (3) generate a payload comprising the ciphertext and the message commitment.

15. The method of claim 13, wherein the data element comprises a ciphertext, and wherein performing the distributed cryptographic operation with one or more other participating devices comprises:
receiving, from an initiating device, a request including a message commitment generated using a message and a hash function;
generating one or more partial computations based on the message commitment and at least the first secret share and the second secret share, wherein the one or more other participating cryptographic devices generate one or more other partial computations using the one or more unique key shares; and
transmitting the one or more partial computations to the initiating device, thereby enabling the initiating device to: (1) generate a session key using the one or more partial computations and one or more additional partial computations, (2) decrypt the ciphertext using the session key, thereby generating the message, and (3) verify that the message is consistent with the message commitment.

16. A method comprising performing, by a confirming device of a plurality of cryptographic devices:
receiving, from a generating device, a secret share, a commitment, and a digital signature, wherein the commitment was generated by the generating device using the secret share and a hash function, and wherein the digital signature was generated by the generating device by digitally signing the commitment using a private key corresponding to the generating device;
receiving, from one or more other generating devices, one or more other commitments and one or more other digital signatures, wherein the one or more other commitments were generated by the one or more other generating devices using one or more other secret shares and the hash function, and wherein the one or more other digital signatures were generated by the one or more other generating devices by digitally signing the one or more other commitments using one or more other private keys;
generating a confirmation value using a second hash function, the commitment, and the one or more other commitments;
transmitting the confirmation value to one or more other cryptographic devices;
receiving one or more other confirmation values from one or more other confirming devices; and
verifying that the one or more other confirmation values and the confirmation value are equivalent.

17. The method of claim 16, wherein generating the confirmation value using the commitment, the one or more other commitments, and the second hash function comprises:
concatenating the commitment and the one or more other commitments, thereby generating a concatenated value; and
hashing the concatenated value using the second hash function, thereby generating a hash value, wherein the confirmation value comprises the hash value.

18. The method of claim 16, further comprising:
verifying the digital signature using the commitment and a public key corresponding to the private key; and
verifying the one or more other digital signatures using the one or more other commitments and one or more other public keys corresponding to the one or more other private keys.

19. The method of claim 18, wherein the one or more other digital signatures include one or more invalid digital signatures, wherein the one or more invalid digital signatures fail to verify, and wherein the method further comprises: transmitting an alert message to the one or more other cryptographic devices, the alert message identifying one or more cryptographic devices corresponding to the one or more invalid digital signatures.

20. A cryptographic device comprising:
a processor; and
a non-transitory computer readable medium coupled to the processor, the non-transitory computer readable medium comprising code that, when executed by the processor, cause the processor to perform a method comprising:
generating a first secret share corresponding to a first device group, the first device group comprising the cryptographic device and one or more other cryptographic devices of a plurality of cryptographic devices;
generating a first commitment by hashing the first secret share using a first hash function;
generating a first signature by digitally signing the first commitment using a first private key;
transmitting the first secret share to the one or more other cryptographic devices in the first device group;
transmitting the first commitment and the first signature to a plurality of other cryptographic devices, wherein the plurality of other cryptographic devices verify that the first signature is valid;
receiving one or more confirmation values from a confirming device group, the confirming device group comprising a threshold number of cryptographic devices of the plurality of cryptographic devices, wherein the one or more confirmation values are generated using a second hash function, the first commitment, and one or more other commitments generated by one or more other generating devices; and
verifying that the one or more confirmation values are equivalent to each other.

\* \* \* \* \*